US007016494B2

(12) United States Patent
Hopkins et al.

(10) Patent No.: US 7,016,494 B2
(45) Date of Patent: Mar. 21, 2006

(54) MULTIPLE CRYPTOGRAPHIC KEY PRECOMPUTE AND STORE

(75) Inventors: W. Dale Hopkins, Gilroy, CA (US); Thomas W. Collins, Saratoga, CA (US); Steven W. Wierenga, Sunnyvale, CA (US); Larry L. Hines, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 831 days.

(21) Appl. No.: 09/818,074

(22) Filed: Mar. 26, 2001

(65) Prior Publication Data

US 2005/0190912 A1  Sep. 1, 2005

(51) Int. Cl.
  *H04L 9/26* (2006.01)
(52) U.S. Cl. .......................................... 380/44; 380/47
(58) Field of Classification Search ................ 713/200, 713/201; 380/47, 277, 278, 279, 44; 708/250
  See application file for complete search history.

(56) References Cited

U.S. PATENT DOCUMENTS

| | | | | |
|---|---|---|---|---|
| 4,168,396 | A | 9/1979 | Best ............................ | 178/22 |
| 4,200,770 | A | 4/1980 | Hellman et al. .............. | 178/22 |
| 4,218,582 | A | 8/1980 | Hellman et al. .............. | 178/22 |
| 4,278,837 | A | 7/1981 | Best .......................... | 178/22.09 |
| 4,319,079 | A | 3/1982 | Best .......................... | 178/22.09 |
| 4,351,982 | A * | 9/1982 | Miller et al. .................. | 380/30 |
| 4,405,829 | A | 9/1983 | Rivest et al. ............... | 178/22.1 |
| 4,424,414 | A | 1/1984 | Hellman et al. .............. | 178/22 |
| 4,433,207 | A | 2/1984 | Best .......................... | 178/22.09 |
| 4,465,901 | A | 8/1984 | Best .......................... | 178/22.08 |
| 4,514,592 | A | 4/1985 | Miyaguchi ................ | 178/22.11 |
| 4,995,082 | A | 2/1991 | Schnorr ....................... | 380/23 |
| 5,046,094 | A | 9/1991 | Kawamura et al. ........... | 380/46 |
| 5,321,752 | A | 6/1994 | Iwamura et al. .............. | 380/24 |
| 5,325,433 | A * | 6/1994 | Torii et al. .................... | 380/30 |
| 5,343,527 | A | 8/1994 | Moore .......................... | 380/4 |
| 5,351,298 | A | 9/1994 | Smith ........................ | 380/30 |
| 5,421,006 | A | 5/1995 | Jablon et al. ................ | 395/575 |
| 5,457,748 | A * | 10/1995 | Bergum et al. ............. | 380/270 |
| 5,761,310 | A | 6/1998 | Naciri ......................... | 380/30 |
| 5,835,594 | A | 11/1998 | Albrecht et al. .............. | 380/23 |
| 5,844,986 | A | 12/1998 | Davis ............................ | 380/4 |
| 5,848,159 | A * | 12/1998 | Collins et al. ................ | 380/30 |
| 5,930,362 | A * | 7/1999 | Daly et al. ................... | 380/277 |
| 6,091,819 | A * | 7/2000 | Venkatesan et al. .......... | 380/28 |
| 6,125,185 | A * | 9/2000 | Boesch ...................... | 380/285 |

(Continued)

OTHER PUBLICATIONS

S.A. Vanstone et al., "Using Four-Prime RSA in Which Some of the Bits are Specified," Dec. 8, 1994, Electronics Letter, vol. 30, No. 25. pp. 2118-2119.

(Continued)

*Primary Examiner*—Gregory Morse
*Assistant Examiner*—Andrew Nalven

(57) ABSTRACT

A method and apparatus provides cryptographic parameters for use in cryptographic applications in response to requests therefor. The method includes the steps of: pre-computing one or more different types of sets of cryptographic parameters, each the type of set being adapted for use by an associated type of cryptographic application; securely storing the pre-computed sets of cryptographic parameters in a memory storage unit; receiving a request for a set of cryptographic parameters having specified characteristics for use in a particular cryptographic application; determining one of the sets of cryptographic parameters stored in the memory storage unit that has specified characteristics; accessing the determined set of cryptographic parameters from the memory storage unit; and providing the determined set of cryptographic parameters with minimal latency.

49 Claims, 7 Drawing Sheets

Figure 1:
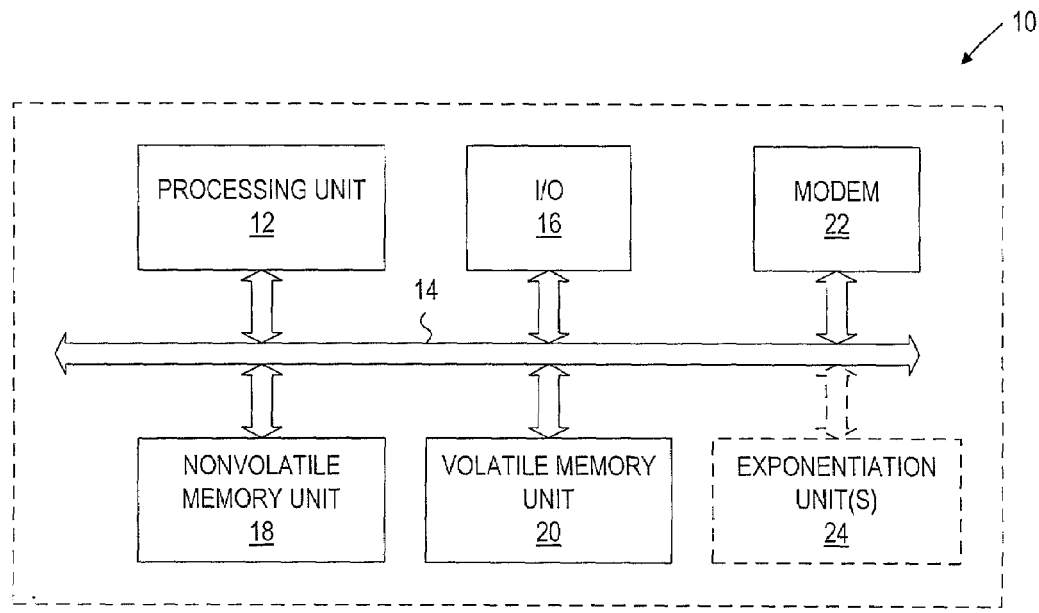

U.S. PATENT DOCUMENTS 6,307,936 B1 * 10/2001 Ober et al. .................... 380/30
6,578,057 B1 *  6/2003 Hori ........................... 708/200

OTHER PUBLICATIONS

C. Couvruer et al., "An Introduction to Fast Generation of Large Prime Numbers," 1982, Philips Journal of Research, vol. 37, Nos. 5-6, pp. 231-264.

Y. Desmedt et al., "Public-Key Systems Based on the Difficulty of Tampering (Is There a Difference Between DES and RSA?)," 1986, Lecture Notes in Computer Science, Advances in Cryptology-CRYPTO '86 Proceedings.

J. J. Quisquater et al., "Fast Decipherment Algorithm for RSA Public-Key Cryptosystem," Oct. 1982, Electronics Letters, vol. 19, No. 21.

CETIN KAYA KOC, "High-Speed RSA Implementation (Version 2.0)," Nov. 1994, RSA White Paper, RSA Laboratories.

Rivest et al., "A Method for Obtaining Digital Signatures and Public-Key Cryptosystems," Feb. 1978, Communications of the ACM, vol. 21.

PKCS #1: RSA Encryption Standard (Version 1.5), Nov. 1993, RSA Laboratories Technical Note.

M.O. Rabin, "Digitalized Signatures and Public-Key Functions as Intractable as Factorization," Jan., 1979, MIT Laboratory for Computer Science.

R. Lidl et al., "Permutation Polynomials in RSA-Cryptosystems," 1984, Advances in Cryptology-Crypto '83, pp. 293-301.

D. Boneh et al., "Generating a Product of Three Primes with an Unknown Factorization," Computer Science Department, Stanford University.

J. J. Quisquater et al., "Fast Generation of Large Prime Numbers" Jun. 1982, Library of Congress, Catalog No. 72-179437, IEEE Catalog No. 82CHI767-3 IT, pp. 114-115.

A. J. Menezes et al., "Handbook of Applied Cryptography", 1997, Library of Congress catalog No. 96-27609, pp. 89, 612-613.

P.J. Flinn et al., "Using the RSA Algoithm for Encryption and Digital Signatures: Can You Encrypt, Decrypt, Sign and Verify Without Infringing the RSA Patent?", Jul. 9, 1997, 17 pgs. http://www.cyberlaw.com/rsa.html.

NEMO, "RSA Moduli Should Have 3 Prime Factors", 1996.

* cited by examiner

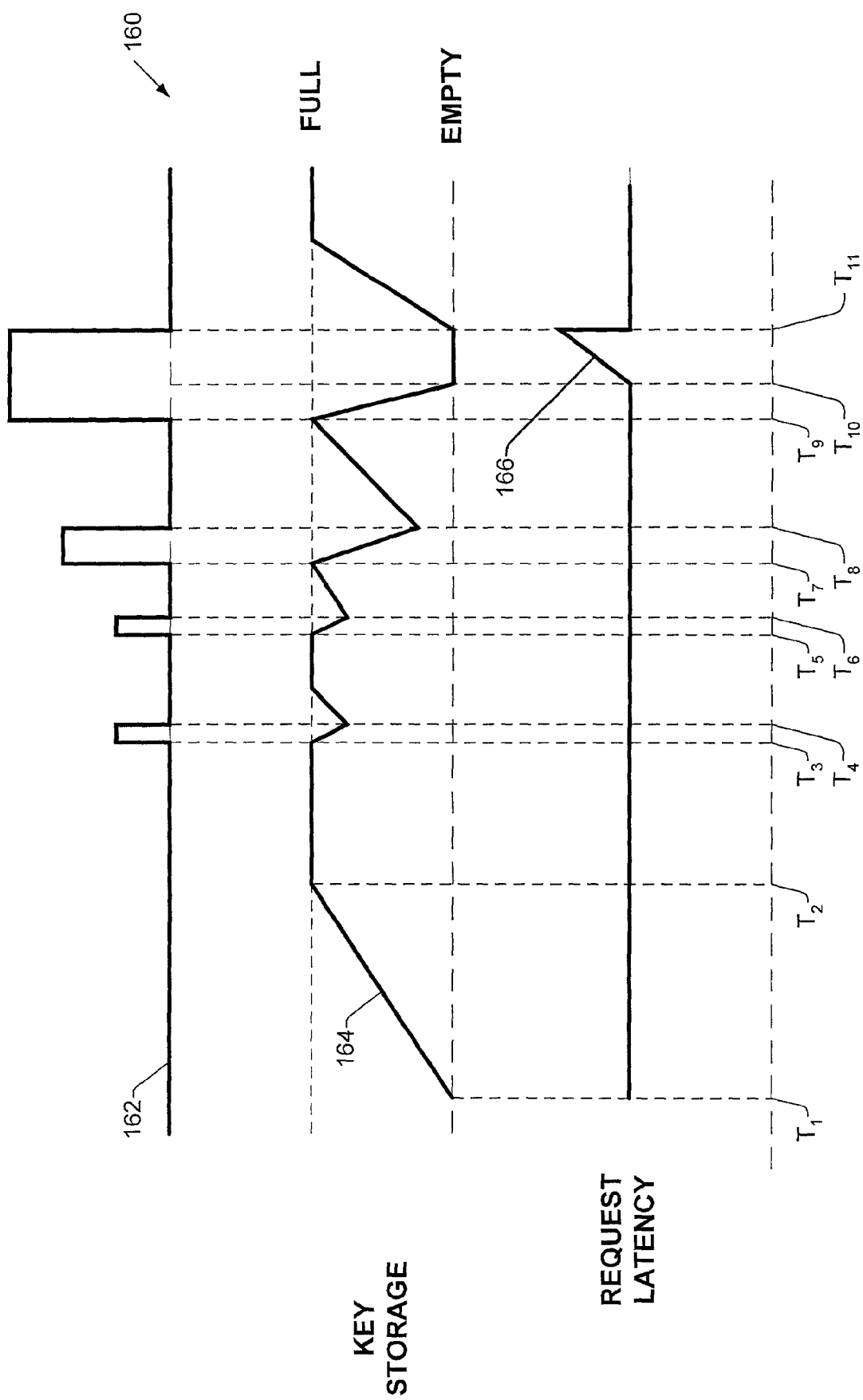

MULTIPLE CRYPTOGRAPHIC KEY PRECOMPUTE AND STORE

CROSS REFERENCE TO RELATED APPLICATIONS

Reference is made to U.S. patent application Ser. No. 09/818,914, filed on Mar. 26, 2001, entitled "Multiple Prime Number Generation Using a Parallel Prime Number Search Algorithm." Reference is also made to U.S. Pat. No. 5,848,159, filed on Dec. 8, 1998, entitled "Public Key Cryptographic Apparatus and Method", which is incorporated by reference.

BACKGROUND OF THE INVENTION

1. Field of the Invention

The present invention relates generally to prime number searching, and more specifically to a system and method for providing cryptographic parameters in response to requests therefor with a minimum amount of latency.

2. Description of the Prior Art

Many different types of cryptographic security systems require a means for determining large prime numbers. As an example, public key cryptographic schemes require large prime numbers to produce cryptographic keys which are used to encipher and decipher data for the purposes of guaranteeing the confidentiality, reliability, and authenticity of information to be stored or transferred from one place to another. As an example, a bank requires some means for keeping financial transactions confidential, and for guaranteeing the authenticity of a financial transaction in order to prevent the wrongful transfer of money.

In a typical cryptographic scheme, an encryption process is performed to transform a plaintext message M into ciphertext C, and a decryption process is performed to transform the ciphertext C back into the plaintext message M. In a public key cryptographic scheme, encryption and decryption processes are performed using a pair of cryptographic keys that are produced based on large prime numbers that meet certain criteria. In the most common application, a public key E defined as the pair $\{e, n\}$ is used to encrypt a message into ciphertext, and a private key D defined as the pair $\{d, n\}$ is typically used to decrypt the ciphertext. It is important to note that the public key E, which may be publicly known, cannot be used to decrypt the ciphertext. Only the private key D, which is kept secret, can be used for decryption of a message encrypted by the public key E. As an example, consider that a sender needs to send an encrypted message M to a recipient. The recipient publishes his or her public key, making it known at least to the sender, and keeps his or her private key secret. The sender then uses the public key to encrypt a message, and send the encrypted message to the recipient who then uses the private key to decrypt the message. Any third party interpreting the encrypted message is unable to decrypt the message without knowing the private key. As further explained below, although the public key is related to the private key, it is computationally difficult to determine the private key from the public key.

One example of a public key cryptography system is the classic "RSA" scheme which capitalizes on the relative ease of generating a composite number as the product of two large prime numbers, as compared with the difficulty of factoring that composite number into its constituent prime numbers. Another example of a public key cryptography system is the Multiprime extension of the RSA system which is described in U.S. patent application Ser. No. 09/328,726, filed on Oct. 26, 1998, by Collins et al. This system also relies for its security on the difficulty of factoring a composite into its constituent prime factors.

The classic two-prime RSA scheme uses a public key E including a composite number n and a number e, where n is defined by relationship (1), below.

$$n = p \cdot q \quad (1)$$

where the factors p and q are different prime numbers, and e is a number relatively prime to (p−1) and (q−1). Importantly, the sender has access to the public key E (including n and e), but not to the prime factors p and q, which are kept secret by the owner.

The sender enciphers a message M (where M<n) to create ciphertext C by computing the exponential relationship (3), below.

$$C = M^e (\bmod n) \quad (3)$$

wherein the number e provides a public exponent (or encryption exponent), and the composite number n provides a modulus. The recipient of the ciphertext C may decrypt the message M using the private key D, which includes a number d and the modulus n, in accordance with relationship (4), below.

$$M = C^d (\bmod n) \quad (4)$$

The number d, which provides a private exponent (or decryption exponent), is a multiplicative inverse of $$e(\bmod 1 \ cm((p-1), (q-1))) \quad (5)$$

so that $$e \cdot d \equiv 1 (\bmod 1 \ cm((p-1), (q-1))) \quad (6)$$

where 1 cm((p−1), (q−1)) is the least common multiple of the numbers (p−1) and (q−1).

Most commercial implementations of the RSA cryptography scheme employ a different although equivalent relationship (7), below, for determining a private exponent d.

$$d \equiv e^{-1} \bmod ((p-1)(q-1)) \quad (7)$$

The security of this cryptographic system relies on the fact that the prime factors p and q of the composite number n are required to determine d and thus to decrypt the ciphertext C, and it is computationally difficult to factor the composite number n into its prime factors p and q.

Cryptanalysis refers to techniques for deciphering encrypted data without prior knowledge of the keys being used. From the time a security scheme becomes publicly known and used, it is subjected to unrelenting attempts to break it. Security levels for encryption schemes are periodically being raised in order to combat increasingly more intelligent or powerful cryptanalytic attacks.

Cryptanalysts are often more interested in discovering the cryptographic keys E and D which are used to decrypt data than in merely discovering the contents of a single message. The most basic method of finding a decryption key is to try all possibilities by an exhaustive key search until the correct key is found. A more sophisticated method is to attempt to factor the modulus n. One method for increasing the security level provided by a public key cryptography system is to increase the length $L_n$ (i.e., size in bits) of the modulus n so that the prime factors p and q cannot be discovered by an exhaustive search or by practical factoring methods. As an example, very large modulus numbers having a long length $L_n$ (e.g., on the order of 512 bits, 768 bits, 1024 bits, and 2048 bits) are now being used in cryptographic keys. In the classic 2-prime RSA encryption algorithm, each of the prime factors p and q has a length $L_{prime}$ which is equal to half the bit length $L_n$, of the modulus n. For example, if the modulus has a length $L_n$, of 1024 bits, then each of the prime factors p and q would have a length $L_{prime}$ of 512 bits. Using cryptographic keys of this size requires a significant amount of computer resources to perform the encryption and decryption operations, but also require much greater resources of a potential attacker to discover the decryption key.

One tradeoff resulting from use of such large cryptographic key values is that the amount of computer processing power required to create a new key pair increases as the lengths of the prime factors increases. The generation of cryptographic keys based on large prime numbers (such as for use in the classic two-prime RSA public key cryptosystem, and in the MultiPrime extension of the RSA system) requires total operations on the order of the key length L (in bits) taken to the fourth power. As the need for stronger security forces an increase in the lengths of modular numbers used in the RSA public key cryptosystems from 512 to 1024, 2048, and 4096 bits, the time and cost of computer resources for generation of a new cryptographic key grows correspondingly in the ratios 1 to 16 to 256 to 4096.

In particular, an increasingly important performance issue is the time and processing power required for prime number generation. Prime number generation refers to processing steps involved in searching for and verifying large prime numbers that meet certain criteria for use in cryptographic keys. Testing the primality of large candidate numbers is very processing intensive. Efficient prime number generation is becoming more important due to several technical developments besides the demand for increased cryptographic key lengths. First, encryption and decryption processes are now being employed for use with inexpensive, processing power limited devices (e.g., cell phones and personal digital assistants (PDA's)). Therefore, it would be desirable to reduce the processing time required for the task of large prime number generation so that the processing resources of even a cell phone or PDA could accomplish the task. Second, there is an ever increasing demand for more cryptographic keys. Smart cards are now being provided with unique public keys.

The most common technique for determining prime numbers is a search method which generally includes the steps of: generating a random odd number $n_0$ in a predefined interval (e.g., the interval between $2^{L-1}$ and $2^L$); determining if the number $n_0$ is a prime number; and if $n_0$ is not a prime number, selecting another candidate $n_1$ in the predefined interval and determining if it is a prime number; and repeating these steps until a prime number is found. A large amount of time and processing power is required to find prime numbers because the relative frequency of occurrence of prime numbers decreases with size. The relative frequency of occurrence of a randomly generated number being prime depends on the size of the number. As an example, for a random number $n_0$ generated in the interval between $2^{L-1}$ and $2^L$, the probability that $n_0$ is prime is roughly equal to 1/L or more approximately 1/(L.ln2). Therefore, the probability that a generated number having a length L is a prime number is inversely proportional to the length of the number. This presents an important problem in public key type cryptography systems where the level of security is dependent at least in part on the length L of the cryptographic keys because increasing the length L to enhance the level of security results in a decrease in the performance of the prime number generation system.

Primality testing, that is the sub-process of determining if a randomly generated number $n_0$ is a prime number, is the most processing intensive aspect of prime number generation. Primality testing may be accomplished using any one of a wide variety of different techniques, or using a combination of different techniques. Probabilistic primality tests provide methods by which arbitrary positive integers are tested to provide partial information regarding their primality. As further explained below, conventional probabilistic primality testing typically utilizes a plurality of sequentially executed primality tests, each being performed including an exponentiation with respect to an associated base integer $\alpha_i$ where $1 \leq i \leq t$. Any single execution of a probabilistic primality test on a number results in a declaration of the number as being either a possible prime or a definite composite. A result of execution of a primality test which declares the number to be composite establishes this with certainty, while a result which declares the number to be a probable prime does not establish primality with certainty. However, execution of a plurality of t successive independent primality tests, each indicating that the integer may be prime, provides for a cumulative probability of error that decreases as the number t increases. If the test is run t times independently on a composite number n, the probability that n is declared possible prime all t times (i.e., the probability of error) is at most $(1/2)^t$, and may be much smaller.

Commonly used probabilistic primality tests include the Fermat primality test and the Miller-Rabin primality test. Fermat's theorem asserts that if n is a prime, and $\alpha_i$ is any integer, $1 \leq \alpha_i \leq n-1$, then relationship (8), below, is true.

$$\alpha_i^{n-1} \equiv 1 (\bmod n) \text{ where } 1 \leq i \leq t \tag{8}$$

If congruency is not found in accordance with relationship (8), that is if the statement defined by relationship (8) is not true, then $\alpha_1$ is said to be a "Fermat witness" to compositeness for n. If n is a composite number, and congruency is found in accordance with relationship (8), then n is said to be a pseudoprime to the base $\alpha_i$, and the integer $\alpha_i$ is called a non-witness or "Fermat liar" to the compositeness of n.

Computer readable instructions for implementing each iteration of relationship (8) may be executed by a processor to determine the veracity of relationship (8) which yields a result declaring either probable primality or compositeness. As mentioned above, for probabilistic primality tests such as the Fermat test, if the results of relationship (8) declare "prime", then there is no absolute proof that the number n is indeed prime. Therefore, exponentiation tests in accordance with relationship (8) are typically repeated t times for $\alpha_1$, $\alpha_2, \ldots \alpha_t$ to determine if each of the t tests declares "prime" in order to achieve an acceptable level of certainty that the candidate is a prime. It is still true that if the prime number candidate passes all of the congruency tests for $\alpha_1, \alpha_2, \ldots \alpha_t$, then there is no guarantee that the candidate is a prime. However, if the prime number candidate P is a composite number, then it will fail at least one of the congruency tests for $\alpha_1, \alpha_2, \ldots \alpha_t$ with a high probability.

Because relationship (8) defines an exponentiation, a significant amount of time and processing resources are required to execute instructions for implementing relationship (8). In order to accelerate the prime number generation process, conventional prime number generation systems typically provide a processor and a single exponentiation unit communicatively coupled with the processor in order to reduce the burden on the processor and speed up the prime number generation process as further explained below. The exponentiation unit is typically an arithmetic logic unit (ALU).

In accordance with conventional prime number generation methods, the generalized steps of randomly generating an odd number $n_0$ and determining if the number $n_0$ is a prime are executed sequentially using the arithmetic unit. If the number $n_0$ is determined to be composite, a next prime number candidate $n_1$ in a sequence of prime number candidates is generated by adding two to the previous number $n_0$, and it is then determined if the number $n_1$ is a prime. Furthermore, in accordance with conventional prime number generation methods, the t exponentiation tests in accordance with relationship (8) for $\alpha_1, \alpha_2, \ldots \alpha_t$ are typically executed in a sequential manner using the arithmetic unit to determine if each of the t tests declares "prime".

Cryptographic key generation in accordance with conventional methods is very time consuming and processing intensive even with the use of fast arithmetic unit. Approximately 20 to 30 seconds is required to generate a cryptographic key value in a device such as a cell phone or PDA using conventional methods. This is partially due to the fact that the prime numbers in a predefined interval (e.g., the interval between $2^{L-1}$ and $2^L$) are far apart, and it is therefore necessary to perform tests on approximately L candidates that are determined to be composite before finding a prime number.

To summarize, the generation of cryptographic keys based on large prime numbers (such as for use in the classic two-prime RSA public key cryptosystem, and in the MultiPrime extension of the RSA system) is a computationally expensive problem requiring total operations on the order of the key length L (in bits) taken to the fourth power. As the need for stronger security forces the RSA public key cryptosystem cryptographic key lengths to grow from 512 to 1024, 2048, and 4096 bits, the time and cost of computer resources for generation of a new key grows correspondingly from 1 to 16 to 256 to 4096. In certain certificate authority applications, key management applications, secure server applications, and secure client applications, both the latency (elapsed time) and the throughput (transactions per second) of the end application involving key generation may be important to operational efficiency and economics or to user satisfaction. During periods of high demand, a queue of key generation requests may grow rapidly, causing a particular request to be delayed for many times the average key generation time, until all prior requests are completed. In addition, there are emerging secure applications where it would be beneficial to allow even more frequent changes of keys and issuance of new keys, if latency and queuing for new cryptographic keys was not so burdensome.

Previous approaches to solving the problems associated with latency and queuing for new cryptographic keys include: choice and optimization of algorithms for efficient large prime number searching via sieving and probablilistic primality testing of large integers; use of faster processors as available; and use of specialized processors and co-processors (including dedicated exponentiation units). All of these prior methods begin a key generation computation only after receipt of a request from an application.

What is needed is a system and method that provides large randomly generated prime numbers and cryptographic key parameters in response to requests therefor with a minimum amount of latency.

What is also needed is a system and method that provides a plurality of large randomly generated prime numbers and cryptographic key parameters where there is no statistical correlation or recurrence among the generated prime numbers so that the highest cryptographic security is maintained.

SUMMARY OF THE INVENTION

It is an object of the present invention to provide a system and method that provides large randomly generated prime numbers and cryptographic key parameters in response to requests therefor with a minimum amount of latency.

It is another object of the present invention to provide a system and method that provides a plurality of large randomly generated prime numbers and cryptographic key parameters where there is no statistical correlation or recurrence among the generated prime numbers so that the highest cryptographic security is maintained.

Briefly, a presently preferred embodiment of the present invention provides a method of rapidly providing cryptographic parameters for use in cryptographic applications in response to requests therefor. The method includes an initial step of pre-computing a plurality of different types of sets of cryptographic parameters, each the type of set being adapted for use by an associated type of cryptographic application using an associated public key exponent value e. Each set of an associated type includes: an associated modulus n having an associated length L and being a composite number generated from the product of an associated number k of randomly generated distinct and suitable prime number values $p_1, p_2, \ldots p_k$, wherein $k \geq 1$; an associated public key exponent value e; an associated private key exponent value d determined based on the associated prime number values $p_1, p_2, \ldots p_k$ and the associated public key exponent value e; a set of sub-task private exponents $d_1, d_2, \ldots d_k$ that are pre-computed based on the associated prime number values $p_1, p_2, \ldots p_k$ and the associated private key exponent value d; and at least one set of Chinese Remainder Algorithm coefficients pre-computed based on the associated prime number values $p_1, p_2, \ldots p_k$. The different types of sets of cryptographic parameters are securely stored in a memory storage unit.

The method of providing cryptographic parameters also includes the step of receiving a request for a specified type of set of cryptographic parameters having specified characteristics for use in a particular cryptographic application. The specified characteristics include: a specified length L of a requested modulus N that is to be a composite number generated as a product of an associated specified number of prime number values; a specified public key exponent value e; and a specified type of Chinese Remainder Algorithm being used by the particular cryptographic application.

The method further includes the steps of: determining one of the sets of cryptographic parameters stored in the memory storage unit that has the specified characteristics; accessing the determined set of cryptographic parameters from the memory storage unit; and providing the determined set of cryptographic parameters with minimal latency.

In accordance with one particular embodiment of the present invention, the set of cryptographic parameters includes only distinct randomly generated and suitable prime number values. In this embodiment, and in the embodiment described above, the method may include the steps of: pre-computing a plurality of randomly generated prime number values; securely storing the randomly generated prime number values in a memory storage unit (which is preferably implemented by any appropriate secure type of memory storage unit); receiving a request for a prime number value having a specified length; accessing one of the prime number values from the memory storage unit; and providing the accessed prime number value with minimal latency in response to the request.

In one embodiment, the step of securely storing the randomly generated prime number values in a memory storage unit further includes: storing at least a portion of the randomly generated prime number values in a first memory unit that is protected within a logical and physical security boundary; encrypting at least one of the randomly generated prime number values using a cryptographic key; storing the cryptographic key in the first memory unit located within the security boundary; and storing the encrypted prime number value in a second memory unit located outside of the security boundary. In this embodiment, the step of accessing includes: accessing the encrypted prime number value from the second memory unit; accessing the cryptographic key from the first memory unit; and decrypting the accessed prime number value using the accessed cryptographic key.

In another embodiment, the step of pre-computing a plurality of randomly generated prime number values is performed by a processing unit and a plurality of exponentiation units communicatively coupled with the processing unit, the plurality of exponentiation units being operative to perform a plurality of primality testing operations in parallel. In this embodiment, the step of pre-computing includes: randomly generating at least one random odd number $n_0$ as a prime number candidate; determining a plurality of y additional candidate odd numbers based on the at least one randomly generated odd number to provide y additional candidates, thereby providing a total number of y+1 candidates; and performing at least one probabilistic primality test on each of the y+1 candidates, each of the y+1 primality tests including an associated exponentiation operation executed by an associated one of a plurality of y+1 of the exponentiation units. Also in an embodiment, a plurality of y+1 of exponentiation operations (one exponentiation operation for performing a primality test on each of the y+1 candidates) are performed by the associated y+1 exponentiation units in parallel.

Note that the randomly generated odd number $n_0$ provides a random seed. In accordance with the present invention, only one prime number value is determined and retained based on each such random seed so that related prime numbers in a particular interval are not retained in the pre-computing. This ensures that there is no correlation between prime numbers that are pre-computed, stored, accessed, and provided with minimal latency in accordance with the present invention.

In accordance with another aspect of the present invention, a server system is provided. The server system is operative to pre-compute prime numbers and to securely store the pre-computed prime numbers for later use. The server system includes: a server computing system operative communicatively coupled with a plurality of remote clients via a network, and including a queuing means for storing a plurality of queued job requests including cryptographic transaction job requests, and prime number requests having associated length parameters specifying a length for a randomly generated prime number, the server computing system being operative to determine a number of prime number requests and a number of transaction job requests currently stored in the queuing means. The server system also includes: a cryptographic processing unit communicatively coupled with the server computing system, and being operative to search for randomly generated prime numbers and to process cryptographic transactions in response to requests therefor; at least one exponentiation unit communicatively coupled with the cryptographic processing unit and providing exponentiation resources for use in searching for randomly generated prime numbers and in processing cryptographic transactions; and a storage means communicatively coupled with the cryptographic unit for storing the randomly generated prime numbers.

The cryptographic unit is operative to perform the steps of: determining a number of pre-computed prime numbers currently stored in the local secure memory unit; based on the number of prime number requests and cryptographic transaction job requests currently stored in the queuing unit, and the number of prime number values currently stored in the storage unit, dynamically allocating a first portion of the exponentiation resources for prime number searching, and a second portion of the total exponentiation resources for processing cryptographic transactions; performing prime number searching functions in response to the prime number requests and associated length parameters, the number searching functions including randomly generating at least one random odd number having the specified length, and performing at least one probabilistic primality test on the random number, each of the primality tests including an associated exponentiation operation executed using the first dynamically allocated portion of the exponentiation resources; and performing cryptographic transaction processing functions in response to the cryptographic transaction job requests using the second dynamically allocated portion of the exponentiation resources.

An important advantage of the system and method of the present invention is that a minimal amount of latency is incurred in providing cryptographic parameters including large prime number values in response to requests therefor.

Another important advantage of the pre-compute and store method of the present invention is that cryptographic parameters including large prime number values may be provided in response to requests therefor at a very high peak output rate.

Yet another important advantage of the method of the present invention is that a plurality of large prime number values may be provided for use in cryptographic applications with minimal correlation and recurrence between the prime number values thereby maintaining high cryptographic security.

The foregoing and other objects, features, and advantages of the present invention will be apparent from the following detailed description of the preferred embodiment which makes reference to the several figures of the drawing.

IN THE DRAWING

Figure 2:
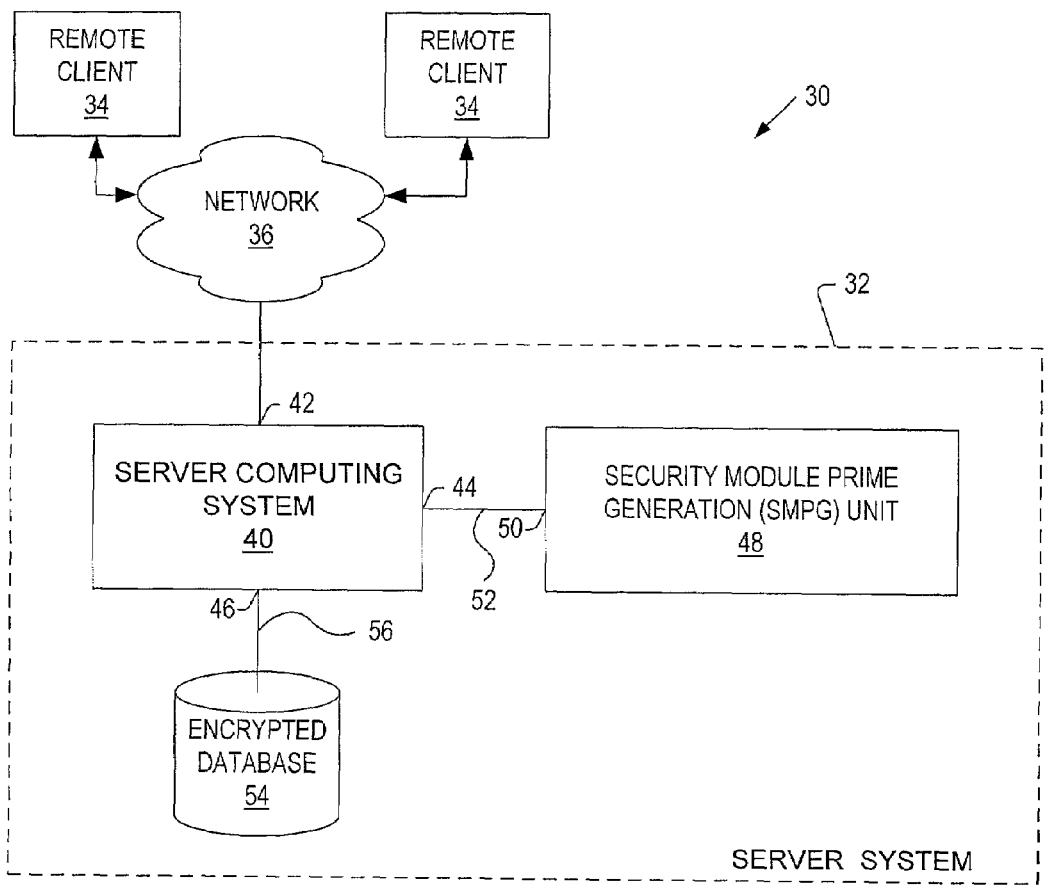
Figure 3:
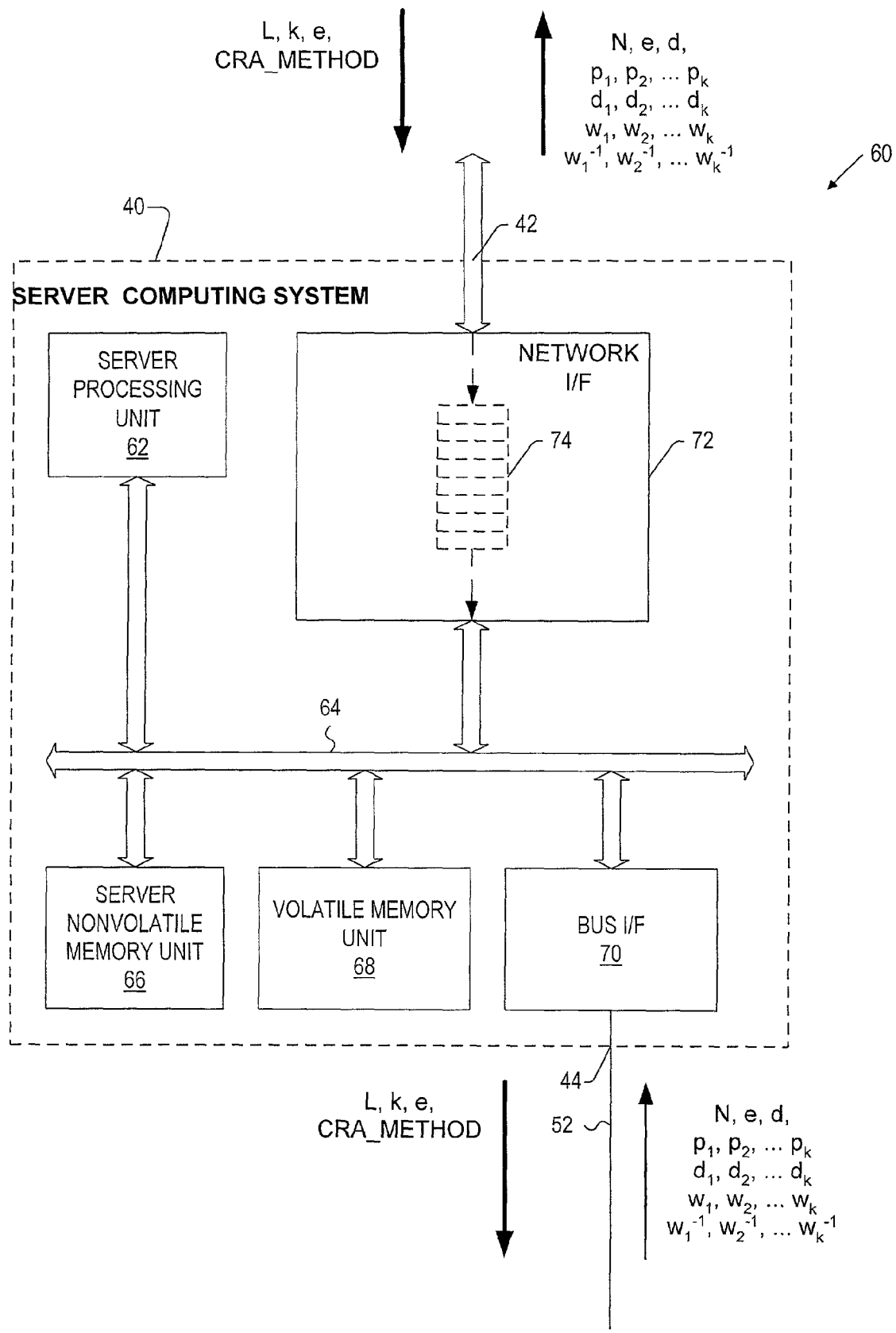
Figure 4:
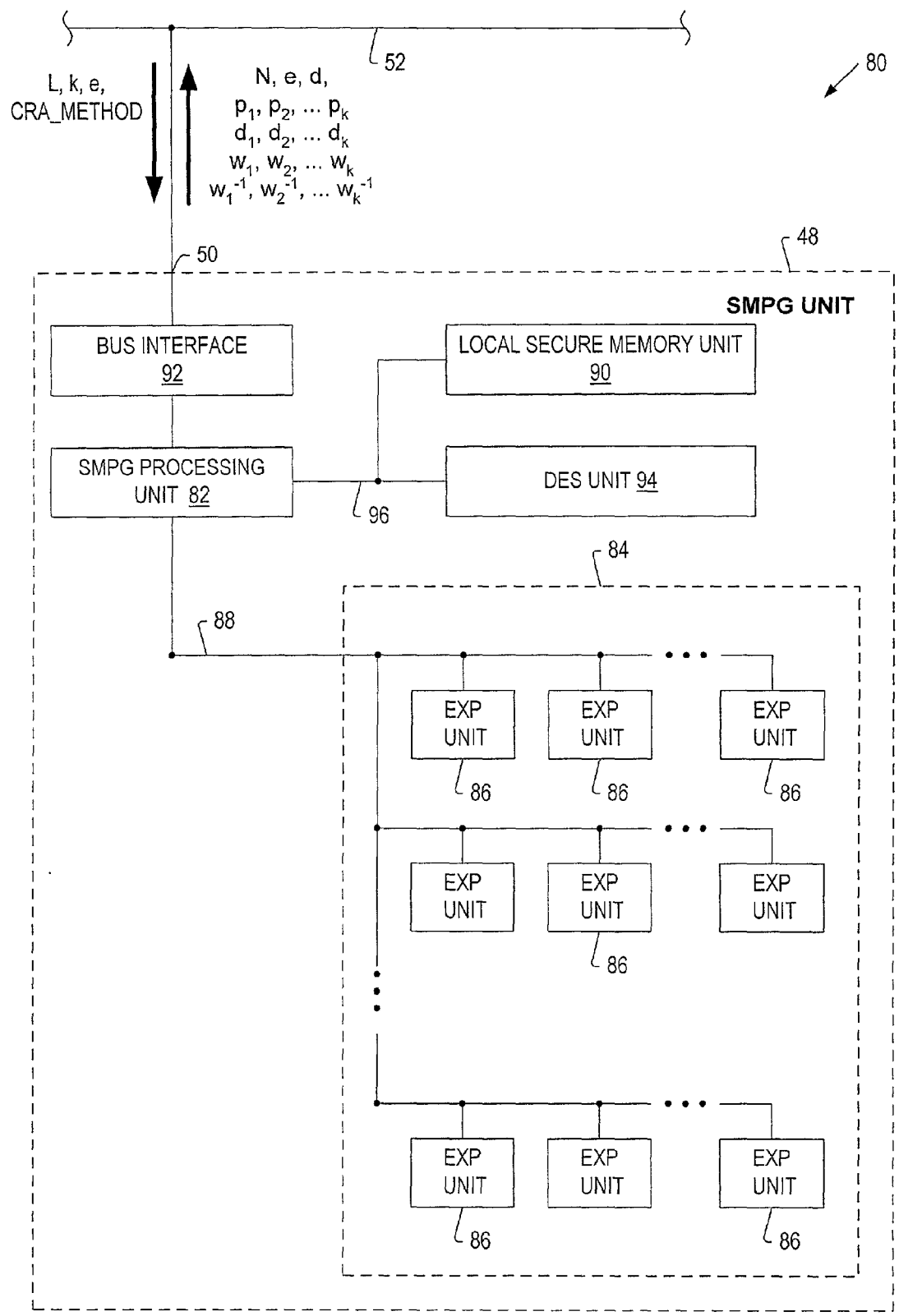
Figure 5:
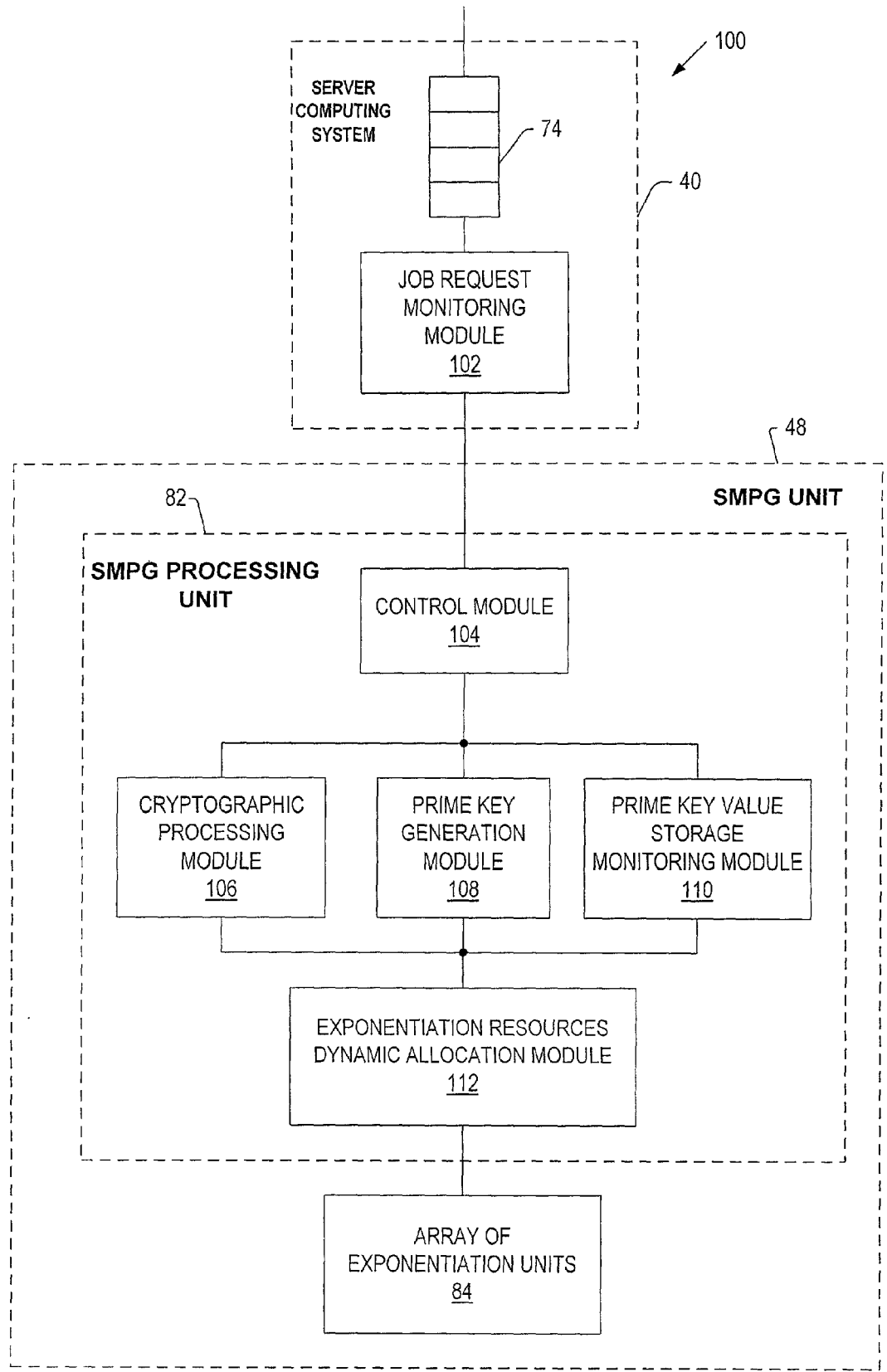
Figure 6:
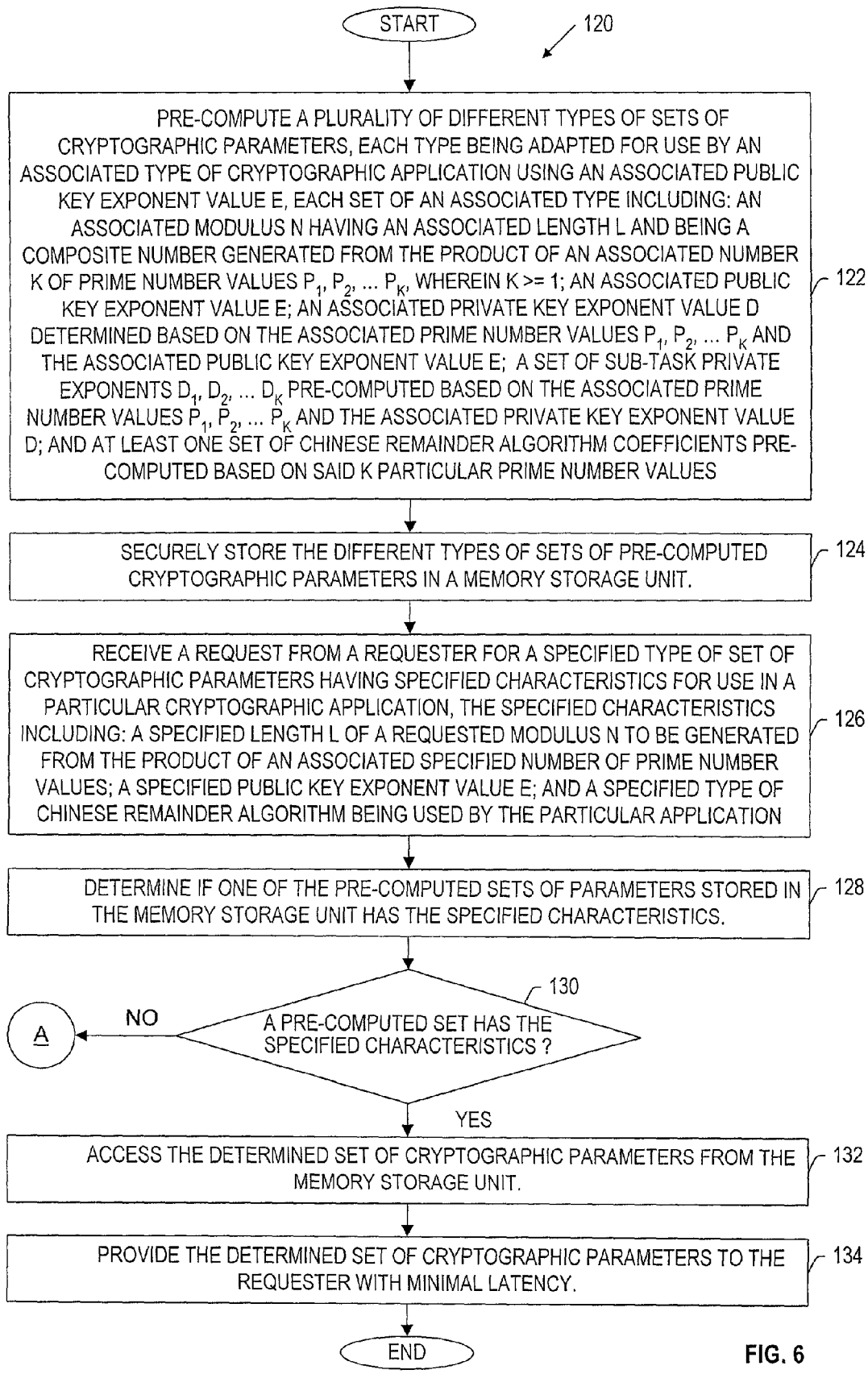
Figure 7:
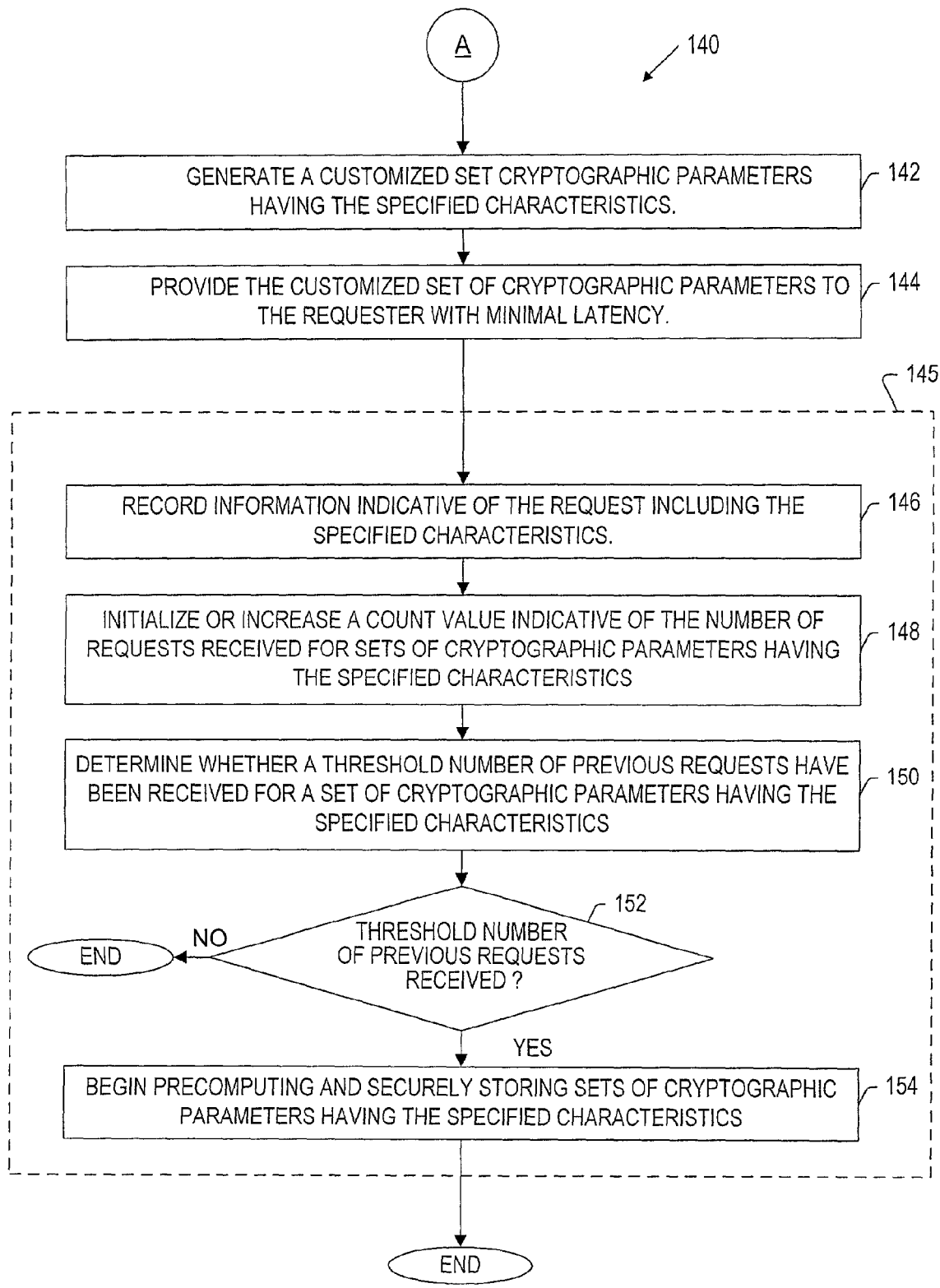

FIG. 1 is a block diagram generally illustrating an inexpensive, low processing power system in accordance with the present invention for pre-computing and securely storing prime numbers;

FIG. 2 is a block diagram generally illustrating a server system in accordance with the present invention for pre-computing and securely storing prime numbers, the server system also being operative to provide cryptographic parameters including large prime number values in response to requests therefor at a very high capacity output rate, the system including a computing system, a security module prime generation (SMPG) unit, and an encrypted database;

FIG. 3 is a block diagram illustrating details of the server computing system of FIG. 2;

FIG. 4 is a block diagram illustrating details of the SMPG unit of FIG. 2 in accordance with one embodiment of the present invention including an array of exponentiation units for executing a parallel prime number search process; and FIG. 5 is a block diagram generally illustrating software modules executed by the server computing system and SMPG unit of FIG. 4 in accordance with one embodiment of the present invention wherein the server system provides dynamic allocation of exponentiation resources of the exponentiation units for processing cryptographic transactions and for generating large prime number values;

FIGS. 6 and 7 are flow diagrams illustrating one embodiment of a process in accordance with the present invention for providing sets of cryptographic parameters (having specified characteristics) for use in cryptographic applications in response to requests received from a requester; and FIG. 8 is a diagram illustrating request latency of the cryptographic pre-compute and store system as a function of time in response to bursts of cryptographic key requests.

DETAILED DESCRIPTION OF THE PREFERRED EMBODIMENTS

As mentioned above, prime number generation in accordance with conventional methods is a very time consuming and processing intensive process even in prime number generation systems using an exponentiation unit. This is partially due to the fact that the prime numbers in a pre-defined interval (e.g., the interval between $2^{L-1}$ and $2^L$) are far apart, and it is therefore necessary to perform probabilistic primality tests on a large number of prime number candidates that are determined to be composite before finding a prime number. However, as described in U.S. patent application Ser. No. 09/818,914, filed on Mar. 26, 2001, entitled "Multiple Prime number generation Using a Parallel Prime Number Search Algorithm", it is evident that Multi-prime cryptographic systems allow for faster and more efficient cryptographic key generation.

Multi-Prime Technology:

U.S. patent application Ser. No. 09/328,726, filed on Oct. 26, 1998, by Collins et al. describes a Multi-Prime cryptographic scheme which uses a composite number modulus having more than two prime factors. In accordance with the Multi-Prime cryptographic scheme, a public key E (including a composite number modulus n and a public exponent e) is determined. A plurality of k (wherein k is an integer greater than 2) random large, distinct prime numbers, $p_1$, $p_2$, ... $p_k$ are developed and checked to ensure that each of $(p_1-1)$, $(p_2-1)$, ..., and $(p_k-1)$ is relatively prime to the number e. Preferably, the prime numbers $p_1$, $p_2$, ... $p_k$ are of an equal length L in bits. However, the system allows for some asymmetry in that the prime numbers may have unequal lengths. Then, the composite number n is defined in accordance with relationship (9) below, $$n = p_1 \cdot p_2 \cdot \ldots \cdot p_k \qquad (9)$$

As further explained below, the composite number n provides a modulus for encoding and decoding operations, and the prime numbers $p_1$, $p_2$, ... $p_k$ are referred to as the prime factors of the modulus n. The prime numbers $p_1$, $p_2$, ... $p_k$ must satisfy three general criteria in order to be used in a Multi-Prime cryptographic system. The prime numbers $p_1$, $p_2$, ... $p_k$ must satisfy the criteria of being distinct, random, and suitable for use in the Multi-Prime cryptographic system.

In order to be distinct, the prime numbers $p_i = p_1, p_2, \ldots p_k$ must satisfy constraint (10), below.

$$p_i \neq p_j \text{ for } i \neq j \qquad (10)$$

In order to be considered random, each of the prime numbers must be produced with equal likelihood and uniformly across the allowed range of values, and they must be statistically independent, that is the prime numbers must satisfy the constraint (11), below:

$$P(p_i = p_B | p_i = p_A) = P(p_i = p_B) \qquad (11)$$

wherein $P(p_j = p_B)$ is the probability that $p_j$ takes the value $p_B$ and $P(p_j = p_B | p_i = p_A)$ is the probability that $p_j$ takes the value $p_B$ knowing that $p_i$ has the value $p_A$.

In order to be suitable for use in the Multi-Prime cryptographic system, the prime numbers $p_i = p_1, p_2, \ldots p_k$ must satisfy the constraints (12a) and (12b), below.

$$2^{L-1} < p_1 \cdot p_2 \cdot \ldots \cdot p_k < 2^L \qquad (12a), \text{ and}$$

$$\text{e does not have any common divisors with } p_i - 1 \qquad (12b)$$

Stated alternatively, constraint (12b) requires that each prime $p_i$ must satisfy the relationship; $GCD(e, p_i - 1) = 1$. This constraint requires that the public exponent e and $(p_i - 1)$ be relatively prime. If e and $(p_i - 1)$ have a common divisor greater than 1, then $p_i$ must be rejected as a suitable key prime.

It is also noted here that there is an alternative statement of this constraint on the primes which may be considered for use in the RSA cryptographic system. This constraint is reflected in the linear congruency of relationship (13), below.

$$e \cdot d \equiv 1 \mod \phi(n) \qquad (13)$$

where $\phi(n)$ is Euler's totient function. Here, d is the private exponent and is the multiplicative inverse of e mod $\phi(n)$ where e is the public exponent. The Totient function may be expressed in accordance with relationship (14), below.

$$\phi(n) = (p_{p1} - 1) \cdot (p_2 - 1) \cdot \ldots \cdot (p_k - 1) \qquad (14)$$

where $n = p_1 \cdot p_2 \cdot \ldots \cdot p_k$

The linear congruency of relationship (13), above has a solution d if and only if $GCD(e, \phi(n)) = 1$. That is, the public exponent e must be relatively prime to $\phi(n)$. This means that e must not have common divisors with $(p_1 - 1)$ or $(p_2 - 1) \ldots$ or $(p_k - 1)$.

A decryption key D, including the composite number n and the private exponent d, is established in accordance with relationship (15), below $$d = e^{-1} \mod ((p_1 - 1)(p_2 - 1) \ldots (p_k - 1)) \qquad (15)$$

In the most common application of the Multi-prime cryptographic scheme, a plaintext message M is encoded to ciphertext C by an encoding process using the public key E wherein the prime factors $p_1, p_2, \ldots p_k$ are not known by the sender. In this application, the encoding process of the multi-prime scheme is performed in accordance with relationship (3), reprinted below.

$$C = M^e (\mod n), \qquad (3)$$

wherein $$0 < M < n - 1, \qquad (3)$$

The decoding process of the Multi-Prime scheme provides for decoding the ciphertext word C to a receive message word M'. The decoding step is usually performed using the private exponent d as a decryption exponent that is defined by relationship (16) below.

$$d \equiv e^{-1} \mod ((p_1 - 1)(p_2 - 1) \ldots (p_k - 1)), \qquad (16)$$

The Multi-prime cryptographic decoding process includes a first step of defining a plurality of k sub-tasks in accordance with relationships (17) below.

$$M_1' \equiv C_1^{d_1} (\text{mod } p_1),$$ (17)

$$M_2' \equiv C_2^{d_2} (\text{mod } p_2),$$

$$\vdots$$

$$M_k' \equiv C_k^{d_k} (\text{mod } p_k),$$

wherein $$C_1 \equiv C(\text{mod } p_1),$$
$$C_2 \equiv C(\text{mod } p_2),$$
$$\vdots$$
$$C_k \equiv C(\text{mod } p_k),$$
$$d_1 \equiv d(\text{mod}(p_1 - 1)),$$
$$d_2 \equiv d(\text{mod}(p_2 - 1)), \text{ and}$$
$$\vdots$$
$$d_k \equiv d(\text{mod}(p_k - 1))$$

The values $d_1, d_2 \ldots d_k$ are referred to as sub-task private components. The above recited sub-tasks are then solved to determine results $M_1', M_2' \ldots M_K'$ which are subsequently combined in accordance with a combining process to produce the receive message word M', whereby M'=M.

The Chinese Remainder Theorem provides a mathematical proof which proves the existence of a unique solution to the sub-tasks described in accordance with the congruency relationships (17) above. These are many different forms of Chinese Remainder Algorithms which may be used to combine the results of these sub-tasks to provide a solution.

U.S. patent application Ser. No. 09/328,726 teaches the use of either a recursive type Chinese Remainder Algorithm (CRA) combining process or a summation type CRA combining process for combining the results $M_1', M_2', \ldots M_k'$ to produce the receive message word M'.

A recursive (or iterative) type of CRA combining process may be performed in accordance with relationship (18), below.

$$Y_i \equiv Y_{i-1} + [(M_i' - Y_{i-1})(w_i^{-1} \text{mod } p_1) \text{mod } p_i] \cdot w_i \text{mod } n,$$ (18)

wherein $2 \leq i \leq k$, and $$M' = Y_k, Y_1 = M_1', \text{ and } w_i = \prod_{j<i} p_j.$$

The summation type of CRA process may be performed in accordance with relationship (19), below.

$$M' \equiv \sum_{i=1}^{k} M_i'(w_i^{-1} \text{ mod } p_i) w_i \text{ mod } n,$$ (19)

wherein $$w_i = \prod_{j \neq i} p_j.$$

The values $w_i$ and $w_i^{-1}$ are referred to as Chinese Remainder Algorithm coefficients. As mentioned above, it is evident that Multi-prime cryptographic systems allow for faster and more efficient cryptographic key generation because the density of prime numbers is greater in intervals searched for Multi-Prime cryptographic systems than in the intervals searched for classic two-prime cryptographic systems. As an example, assume a modulus n having a length L of 1024 bits. In a classic two-prime cryptographic system, each of the factors p and q must have a length of 512 bits in order to prevent the modulus length of 512 bits. In a Multi-Prime cryptographic system wherein the number of prime factors k=3, each of the factors $p_1$, $p_2$, and $p_3$ must have a length of 341 or 342 bits to provide this modulus. Because the density of primes in the interval $[2^{341-1}, 2^{341}]$ is higher than in the interval $[2^{512-1}, 2^{512}]$, it is faster and more efficient to search for cryptographic keys for use in a Multi-prime cryptographic system than it is to search for cryptographic keys for use in the classic two-prime cryptographic system. However, the present invention uses a system and method for prime number generation that provides improved performance and efficiency in generating cryptographic keys for use in either Multi-prime cryptographic systems or classic two-prime cryptographic systems.

FIG. 1 shows a block diagram generally illustrating a first embodiment of a system at 10 in accordance with the present invention for pre-computing and securely storing sets of cryptographic parameters including prime number values. As further explained below, the system provides for pre-computing different types of sets of cryptographic parameters (each type having different characteristics). For use in different types of cryptographic systems.

The system 10 provides an inexpensive, low processing power implementation of the present invention. In varying embodiments, the system 10 may be a personal computer, a personal digital assistant (PDA), or a cellular telephone that is required to generate cryptographic parameters for use in cryptographic applications such as a classic two-prime or Multiprime cryptographic security applications utilizing different modulus lengths, different numbers of prime factors, and different Chinese Remainder Algorithms.

The system 10 generally includes: a processing unit 12 communicatively coupled with a system bus 14; an input/output unit 16 such as a keyboard pad coupled with the processing unit via the system bus; a non-volatile memory unit 18 (e.g., a hard disk drive, or an erasable programmable ROM) coupled with the processing unit via the system bus coupled with the processing unit via the system bus; and a modem 22 providing an interface for communication with remote devices via a network (e.g., an Internet Protocol (IP) network), and also being connected to the system bus.

The non-volatile memory unit 18 provides for storing computer readable instructions including instructions for pre-computing and securely storing sets of cryptographic parameters in accordance with the present invention. Each type of set of cryptographic parameters includes: an associated modulus n having an associated length L and being a composite number generated from the product of an associated number k of randomly generated distinct and suitable prime number values $p_1, p_2, \ldots p_k$, wherein $k \geq 1$; an associated public exponent value e; an associated private exponent value d determined based on the associated prime number values $P_1, P_2, \ldots p_k$ and the associated public exponent value e; a set of sub-task private exponents $d_1, d_2, \ldots d_k$ pre-computed based on the associated prime number values $p_1, p_2, \ldots p_k$ and the associated private key exponent value d in accordance with relationship (17) described above; a first set of Chinese Remainder Algorithm coefficients $w_i$ and $w_i^{-1}$ pre-computed based on the associated prime number values $p_1, p_2, \ldots p_k$ in accordance with relationship (18) described above for the or iterative type of Chinese Remainder Algorithm; and a second set of Chinese Remainder Algorithm coefficients $w_1$ and $w_i^{-1}$ pre-computed based on the associated prime number values $p_1$, $p_2$, ... $p_k$ in accordance with relationship (19) described above for the summation type of Chinese Remainder Algorithm. As described above, the prime number values $p_1$, $p_2$, ... $p_k$ must satisfy all of the requirements of being distinct, random, and suitable as stated in accordance with relationships (10) through (14) above.

In accordance with the present invention, the processing unit 12 is operative to execute instructions (which may be accessed from the nonvolatile memory unit 18, or downloaded from a remote source that is not shown via an IP network using the modem 22) for determining appropriate requested cryptographic parameters. In accordance with the present invention, the instructions for determining the sets of parameters may configure the processing unit to implement any type of prime number searching process that provides for generating prime number values satisfying all of the criteria described above. In accordance with one embodiment, the system 10 may optionally include one or more exponentiation units 24 each being operative to perform exponentiation operations associated with primality testing. In one embodiment of the present invention, the instructions for determining the cryptographic parameters (including large prime number values) may configure the processing unit to implement a parallel prime number search process such as that described in U.S. patent application Ser. No. 09/818,914, filed on Mar. 26, 2001, entitled "Multiple Prime number generation Using a Parallel Prime Number Search Algorithm."

In accordance with the present invention, the system 10 is operative to pre-compute and store sets of cryptographic parameters in a key memory storage unit which may be implemented by the non-volatile memory unit 18. The pre-computed and stored cryptographic parameters may subsequently be accessed from memory for use in an application such as a cryptographic security scheme. Note that the application requesting the set of cryptographic parameters may be running on the system 10 or on a different system that is communicatively coupled with the system 10 via the modem 22. The process for pre-computing and storing cryptographic parameters in accordance with the present invention provides the advantage of minimal latency in providing cryptographic parameters. The time required to generate the required prime number values of the cryptographic parameters in a low processing power system may be 20 to 30 seconds. This latency is avoided by: pre-computing cryptographic parameters during periods wherein the processing unit 12 is not busy performing other tasks; and then storing the pre-computed cryptographic parameters in the memory unit for later use.

FIG. 2 shows a block diagram generally illustrating a client-server system at 30 in accordance with the present invention. The system 30 includes: a cryptographic pre-compute and store server system 32 communicatively coupled with a plurality of remote clients 34 via a network 36 (e.g., an internet protocol (IP) network).

The server system 32 is operative to pre-compute and securely store a plurality of different types of sets of cryptographic parameters, each type of set being adapted for use by an associated type of cryptographic application. Each type of set of cryptographic parameters includes: an associated modulus n having an associated length L and being a composite number generated from the product of an associated number k of randomly generated distinct and suitable prime number values $p_1$, $p_2$, ... $p_k$, wherein $k \geq 1$; an associated public key exponent value e; an associated private key exponent value d determined based on the associated prime number values $p_1$, $p_2$, ... $p_k$ and the associated public key exponent value e; a set of sub-task private exponents $d_1$, $d_2$, ... $d_k$ pre-computed based on the associated prime number values $p_1$, $p_2$, ... $p_k$ and the associated private key exponent value d in accordance with relationships (17) described above; a first set of Chinese Remainder Algorithm coefficients $w_i$ and $w_i^{-1}$ pre-computed based on the associated prime number values $p_1$, $p_2$, ... $p_k$ in accordance with relationship (18) described above for the or iterative type of Chinese Remainder Algorithm; and a second set of Chinese Remainder Algorithm coefficients $w_i$ and $w_i^{-1}$ pre-computed based on the associated prime number values $p_1$, $p_2$, ... $p_k$ in accordance with relationship (19) described above for the summation type of Chinese Remainder Algorithm. As described above, the prime number values $p_1$, $p_2$, ... $p_k$ must satisfy all of the requirements stated in accordance with relationships (10) through (14) above.

Each of the clients 34 may be executing a different type of cryptographic application such as an application for generating a digital signature or an application for establishing cryptographic communications in accordance with various different types of cryptographic schemes including conventional two-prime RSA cryptographic schemes and Multi-Prime cryptographic schemes. Each of these applications may use a modulus n having a different length L and having a different number of constitutes prime factors $p_1$, $p_2$, and $p_k$, may employ a different public exponent e, and may perform encryption or decryption in accordance with a different form of Chinese Remainder Algorithm.

The server system 32 receives for sets or cryptographic parameters requests from each of the clients, each request including a set of cryptographic key request parameters including: a length L which is a specified length in bits of a modulus N that is required by the particular client; a specified number k of prime factors $p_1$, $p_2$, ... $p_k$ of the modulus N required by the client; a specified public exponent e (to which each prime minus one must be relatively prime); a specified type of Chinese Remainder Algorithm (CRA) that is to be used (if any) by the client; and an indication of whether "CRA pre-computables" are to be provided by the system 30. The CRA pre-computables may include: $[w_1, w_2, \ldots w_k]$ and $[w_1^{-1}, w_2^{-1}, \ldots w_k^{-1}]$ which are used in the recursive (or iterative) type of CRA combining process and the summation type of CRA process as explained above.

In response to each cryptographic key request, the server system 32 provides an appropriate a set of cryptographic parameters as described in further detail below. When an application request for a new set of cryptographic parameters arrives, the client request is immediately serviced (with latency of just a few hundred or thousand cycles) by locating and issuing a stored but unused set of cryptographic parameters having the specified characteristics from a key memory storage unit that may be implemented in several different ways as further described below. The issued set of cryptographic parameters is subsequently deleted from the key memory storage unit, or marked invalid, to avoid duplicate issuance.

During periods of high demand for new sets of cryptographic parameters, the server system 32 continues to satisfy requests for sets of cryptographic parameters whenever possible, and meanwhile continues to replenish the key memory storage unit with new sets of cryptographic parameters. This approach allows peak loads to be met without degradation, while the key memory storage unit is replenished and refilled during periods where generation capacity exceeds demand. Simple expansion of the key memory storage unit's memory capacity is an effective method of matching peak demands with a lower average rate.

Pre-computed cryptographic keys values may be used to establish secure socket layer (SSL) communication links with the remote clients. Pre-computed cryptographic parameters are also provided to the remote clients for use by the remote clients in executing the corresponding applications.

The server system 32 includes: a server computing system 40 having a port 42 communicatively coupled with the network 36, and ports 44 and 46 further explained below; a security module prime generation (SMPG) unit 48 operative to generate prime number values and having a port 50 communicatively coupled with port 44 of the server computing system 40 via a server system bus 52; and an encrypted database 54 communicatively coupled with port 46 of the server computing system 40 via an interface 56.

In accordance with the present invention, the SMPG unit 48 may include any type of hardware and/or software components configured to implement any type of prime number searching process that provides randomly generated prime number values these meet the criteria for use in cryptographic system as outlined above. In one embodiment of the present invention, the server system bus 52 is a peripheral component interface (PCI) bus, and the SMPG unit 48 is implemented as a PCI card. The SMPG unit 48 provides a logical and physical security boundary which ensures that the SMPG unit is secure from external probing. As further described below, in the described embodiment, the SMPG unit 48 includes local secure memory storage space for implementing the key memory storage unit for storing pre-computed cryptographic parameters.

In accordance with the present invention, the key memory storage may be expanded to store additional pre-computed cryptographic parameters in a memory unit of the server computing system, and in the encrypted database 54. In order to maintain security, the pre-computed prime number values generated by the SMPG unit 48 are encrypted by the SMPG unit 48 before being transmitted to the server computing system and/or the encrypted database 54. In accordance with one embodiment, the pre-computed prime number values (to be stored outside of the secure boundary of the SMPG unit) are encrypted using other cryptographic parameters which are then stored in memory within the secure boundary of the SMPG unit.

FIG. 3 is a block diagram illustrating details of the server computing system 40 (FIG. 2). The system 40 generally includes: a server processing unit 62 communicatively coupled with a local system bus 64; a server non-volatile memory unit 66 (e.g., a hard disk drive, or an erasable programmable ROM) coupled with the server processing unit via the bus 64, for storing pre-computed cryptographic parameters (in either an encrypted or plaintext form), and also for storing computer readable instructions as further explained below; a volatile memory unit 68; a bus interface 70 connected to the local bus 64 and providing for communication with the SMPG unit 48 (FIG. 2) via the server system bus 52; and a network interface 72 providing for communication with remote clients via the network 36 (FIG. 2), and also being connected to the bus 64. The network interface 72 provides for receiving job requests including cryptographic parameters generation job requests and cryptographic processing job requests. The job requests are enqueued in a job request queue 74. In varying embodiment of the present invention, the queue 74 may be implemented in hardware located in the interface 72 (e.g., as ones or more registers) or may be implemented as software executed by the processing unit 62. As further explained below, the server processing unit 62 is operative to execute instructions, accessed from the memory unit 66, for monitoring and processing job requests stored in the job request queue 74 including requests for cryptographic parameters.

FIG. 4 shows a block diagram illustrating a particular embodiment at 80 of the SMPG unit 48 (FIG. 2) which is operative to determine cryptographic parameters including prime number values in accordance with a parallel prime number search process such as that described in U.S. patent application Ser. No. 09/818,914, filed on Mar. 26, 2001, entitled "Multiple Prime number generation Using a Parallel Prime Number Search Algorithm." In the depicted embodiment, the SMPG unit at 80 includes: an processing unit 82; an array 84 of exponentiation units 86 each being communicatively coupled with the SMPG processing unit 82 via an input/output (I/O) bus 88, and being operative to execute exponentiation operations in accordance with a parallel prime number search process of the present invention as further explained below; a local secure memory unit 90 communicatively coupled with the processing unit 82; and a bus interface 92 providing an interface between the processing unit 82 and server computing system 40 (FIG. 2) via the server system bus 52.

The local secure memory unit 90 provides for storing pre-computed cryptographic parameters, and also for storing cryptographic keys for deciphering encrypted pre-computed cryptographic parameters stored outside of the security boundary of the SMPG unit. In order to ensure a secure environment, it is preferable that the SMPG unit meet the Federal Information Processing Standard (FIPS) 140-2 level 3. Accordingly, the processing unit 82 may be implemented in accordance with a design that is secure from external probing. In one embodiment, the SMPG unit 48 includes a data encryption standard (DES) unit 94 for encrypting pre-computed cryptographic parameters to be stored outside of the security boundary of the SMPG unit.

In an embodiment, each of the exponentiation units 86 is a state machine controlled arithmetic circuit that is responsive to a set of probabilistic primality test parameters, and operative to perform an exponentiation operation based on the test parameters, and to generate a primality test result signal declaring either "prime" or "composite" as further explained below. In one embodiment, each of the exponentiation units 86 of the array is implemented on a circuit board. In another embodiment, each of the exponentiation units 86 is implemented on a single integrated circuit (IC).

In operation, the processing unit 82 randomly generates an odd number $n_0$ in a predefined interval (e.g., the interval between $2^{L-1}$ and $2^L$) in accordance with any of a variety of well known random number generating techniques. The randomly generated number $n_0$ provides a first candidate to be tested for primality in accordance with a parallel prime number search process of the present invention. As described above, the probability that the number $n_0$ (randomly generated in the predefined interval between $2^{L-1}$ and $2^L$) is a prime is approximately equal to 1/L. Therefore, as L increases, the probability that the number $n_0$ is a prime decreases.

The array 84 of exponentiation units 86 are used to perform accelerated searching of multiple prime numbers by performing a plurality of exponentiation functions simultaneously and in parallel in accordance with a parallel prime number search process of the present invention. As further explained below, the present invention provides several embodiments of the parallel prime number search process, each embodiment providing for execution of multiple probabilistic primality tests simultaneously and in parallel using selected ones of the array of exponentiation units 86 in order to facilitate accelerated searching of multiple prime numbers.

As mentioned above, if the number $n_0$ is a prime number, then probabilistic primality testing will require the execution of a plurality of t of primality tests, each being performed with respect to an associated base integer $\alpha$, in order to establish with an acceptable level of certainty that the number is a prime. In accordance with one aspect of the present invention, a number t of the exponentiation units 86 of the array 84 may be used to perform the plurality of t primality tests for determining whether a particular candidate is a prime number. In accordance with the present invention, any suitable primality test may be performed. In one embodiment, the system 80 tests the primality of randomly generated numbers in accordance with t iterations of the Miller-Rabin primality test. In another embodiment, the system 80 tests for primality by performing t different iterations of the Fermat primality test.

As mentioned above, Fermat's theorem asserts that if n is a prime, and $\alpha$ is any integer, $1 \leq \alpha \leq n-1$, then relationship (20), below, is true.

$$\alpha^{P-1} \equiv 1 \pmod{p} \tag{20}$$

where P is a prime number candidate (e.g., $P=n_0$).

Because a single probabilistic primality test does not determine primality with certainty, the system 80 tests the primality of randomly generated numbers by performing t different executions of the Fermat probabilistic primality test in accordance with relationship (21) below $$\alpha_1^{P-1} \equiv 1 \mod P \tag{21}$$
$$\alpha_2^{P-1} \equiv 1 \mod P$$
$$\vdots$$
$$\alpha_t^{P-1} \equiv 1 \mod P$$

where P is a prime number candidate (e.g., $P=n_0$).

Each of the exponentiation units 86 is responsive to a set of probabilistic primality test parameters (including an associated base value $\alpha_1, \alpha_2, \ldots \alpha_t$, and a prime number candidate P), and operative to perform an exponentiation operation based on the test parameters, and to generate a primality test result signal declaring either "prime" or "composite".

In accordance with a search ahead aspect of the present invention, the processing unit 82 generates an additional number y of odd numbers to serve as prime number candidates $(n_1=n_0+2, n_2=n_0+4, n_3=n_0+6, \ldots n_y=n_0+(y\cdot2))$ based on the initial randomly generated odd number $n_0$ by successively adding two to the number $n_0$. Exponentiation operations may then be performed in accordance with a first one of the probabilistic primality tests using the base $\alpha_1$ on each of the y+1 candidates $(n_0, n_1, \ldots n_y)$ simultaneously and in parallel using y+1 selected ones of the exponentiation units 86 of the array. As an example, if y=4, each of a set of five prime number candidates $(n_0, n_0+2, n_0+4, n_0+6, n_0+8)$ may be tested in accordance with the first primality test by performing exponentiation operations using the base $\alpha_1$ on each of the candidates simultaneously and in parallel using five selected ones of the exponentiation units 86 of the array.

In order to maximize security, it is necessary to ensure that there is no statistical correlation or recurrence among prime number values generated by the SMPG unit 48. Therefore, after a single prime number value is found in a set of numbers $(n_0, n_1=n_0+2, n_2=n_0+4, n_3=n_0+6, n_y=n_o+(y\cdot2))$ generated based on a particular randomly generated number $n_0$, the process stops searching for additional prime numbers in this set of numbers, and generates a new randomly generated number $n_0$. This measure ensures that the SMPG unit does not pre-compute and store nearby prime number key values so that cryptanalysts cannot exploit the prime number values based on such a correlation.

In another embodiment of the present invention, the search ahead aspect of the present invention may be implemented in searching for k prime number values simultaneously and in parallel. In this embodiment, the SMPG processing unit 82 initially generates a plurality of k random odd numbers $n_{0,0}, n_{1,0}, \ldots n_{(k-1),0}$, and then generates an additional number y of odd numbers for each of the random odd numbers $n_{0,0}, n_{1,0}, \ldots n_{(k-1),0}$ by successively adding two to the number $n_0$. This yields a plurality of $(k \times (y+1))$ candidates $(n_{0,1}=n_{0,0}+2, n_{0,2}=n_{0,0}+4, \ldots n_{0,y}=n_{0,0}+(y\cdot2))$, $(n_{1,1}=n_{1,0}+2, n_{0,2}=n_{1,0}+4, \ldots n_{1,y}=n_{1,0}+(y\cdot2)), \ldots (n_{(k-1),1}=n_{(k-1),0}+2, n_{(k-1),2}=n_{(k-1),0}+4, \ldots n_{(k-1),y}=n_{(k-1),0}+(y\cdot2))$ each of which may be subjected to t probabilistic primality tests simultaneously and in parallel using an array of $(k \times t \times (y+1))$ of the exponentiation units 86.

As further explained below, in accordance with one embodiment of the present invention, the parallel prime number search process may be executed to search for a plurality of k prime number values $p_1, p_2, \ldots p_k$ simultaneously and in parallel using a plurality of k of the exponentiation units 86. In accordance with this embodiment, the k exponentiation units 86 are used to execute exponentiation operations associated with k probabilistic primality tests, for each of k prime number, simultaneously and in parallel. In another embodiment of the present invention, an array of $(k \times t)$ of the exponentiation units 86 are used in parallel to simultaneously execute a plurality of t probabilistic primality tests on each of k prime number candidates. In yet another embodiment of the present invention, an array of $(k \times t \times y+1)$ of the exponentiation units 86 are used to simultaneously execute a plurality of t probabilistic primality tests on each of k sets of (y+1) prime number candidates.

Input values and output values to and from the SMPG unit 48 include: a parameter L specifying a length of a modulus N to be used for generating at least one set of cryptographic parameters; a parameter k specifying a number of prime number values to be searched for in parallel based on an associated one of an initial randomly generated number $n_{0,0}, n_{1,0}, \ldots n_{k,0}$; a parameter t specifying a number of exponentiation operations associated with probabilistic primality tests to be executed in parallel; and a parameter y specifying a number of additional candidates to be tested in parallel for each of the initial randomly generated number $n_{0,0}, n_{1,0}, \ldots n_{k,0}$.

In a first embodiment of the present invention, the parameters L, k, t, and y are predetermined and stored in the memory unit 90 along with computer readable instructions executable by the processing unit 82 for implementing a parallel prime number searching process wherein an array of $(k \times t \times (y+1))$ of the exponentiation units 86 are used to simultaneously execute a plurality of t probabilistic primality tests on each of k sets of (y+1) prime number candidates to yield prime number values.

In a second embodiment of the present invention, the length parameters L are provided by remote clients 34 (FIG. 2) along with prime number generation job requests provided to the processing unit 82 via the bus interface 92. In this embodiment, computer readable instructions stored in the system memory unit and executable by the processing unit, provide for implementing an embodiment of the parallel prime number searching process wherein a user selected array of (k×t×(y+1)) of the exponentiation units 86 are used to simultaneously execute a plurality of t probabilistic primality tests on each of k sets of (y+1) prime number candidates to yield a set of cryptographic parameters based on a modulus having a specified length L.

FIG. 5 is a block diagram generally illustrating software modules executed by the server computing system 40 (FIG. 3) and by the SMPG unit 48 (FIG. 4) in accordance with one embodiment of the present invention wherein the server system provides dynamic allocation of exponentiation resources of the exponentiation units for processing cryptographic transactions and generating prime number values. The software modules include: a job request monitoring module 102 implemented as instructions executed by the server processing unit 62 (FIG. 3); and an SMPG control module 104, a cryptographic transaction processing module 106, a prime number generation processing module 108, a cryptographic parameters storage monitoring module 110, and an exponentiation resources dynamic allocation module 112 each being implemented as instructions executed by the SMPG processing unit 82 (FIG. 4). The modules 102, 104, 106, 108, 110, and 112 are operative to pass requests, parameters, and instructions to each other as further explained below for the purpose of dynamically allocating exponentiation resources for processing cryptographic transactions and generating cryptographic parameters.

The job request monitoring module 102 determines the number of prime number generation job requests and the number of cryptographic transaction job requests currently stored in the queuing unit 74. As explained above, the queuing unit 74 provides for storing a plurality of queued job requests including cryptographic transaction job requests, and prime number generation job requests having associated length parameters specifying a length for a prime number to be randomly generated. The requests are either generated locally or received from remote clients.

The cryptographic parameters storage monitoring module 112 is operative to determine a number of pre-computed prime numbers currently stored in the local secure memory unit 90 ((FIG. 4), in the memory unit 66 (FIG. 3) of the server computing system, and in the encrypted database 54 (FIG. 2). In one embodiment, the monitoring module 112 maintains a count which is increased by one when a prime number value is pre-computed and stored, and decreased by one when a prime number value is accessed from memory and provided in response to a request therefor.

The SMPG control module 104 receives: information from module 102 indicating the number of prime number generation job requests and cryptographic transaction job requests currently stored in the queuing unit 74; and information provided by the storage monitoring module 112 indicating the number of sets of cryptographic parameters currently stored. Based on the received information, the control module 104 determines: a percentage of the total exponentiation resources of the array 84 of exponentiation units 86 (FIG. 4) to be dynamically allocated for searching for prime number values in response to prime number generation job requests; and a percentage of the total exponentiation resources to be dynamically allocated for processing cryptographic transactions in response to job requests therefor. The exponentiation resources dynamic allocation module 112 is responsive to information indicating the percentages of the total exponentiation resources to be dynamically allocated for cryptographic key searching and cryptographic transaction processing.

Based on the number of prime number generation job requests and cryptographic transaction job requests currently stored in the queuing unit, and the number of prime number values currently stored in the server system, the control module 104 provides cryptographic transaction job requests and prime number generation job requests to the cryptographic transaction processing module 106 and prime number generation module 108 respectively.

The cryptographic transaction processing module 104 is responsive to transaction job requests received via the control module, and operative to process cryptographic transactions using the percentage of the exponentiation resources currently allocated for processing cryptographic transactions.

The prime number generation module 108 is responsive to prime number generation job requests and associated length parameters received via the control module, and operative to randomly generate prime number values of the specified length by using the percentage of the exponentiation resources currently allocated for prime number generation in accordance with the Multi-Prime parallel searching process explained above.

In one embodiment, the control module 104 is operative to determine whether the number of stored prime number values is less than a predetermined number. If the number of stored prime numbers is less than a predetermined number, control module 104 instructs the module 112 to dynamically increase the percentage of the exponentiation resources allocated for prime number generation.

FIG. 6 shows a flow diagram illustrating one embodiment of a process at 120 in accordance with the present invention for providing sets of cryptographic parameters (having specified characteristics) for use in cryptographic applications in response to requests received from a requester. The process 120 is executed by a cryptographic parameter pre-computing system in accordance with the present invention. In one embodiment, the process 120 is executed by the system 10 (FIG. 1), and the set of cryptographic parameters having the specified characteristics is requested by a cryptographic application that is also running on the system 10. In another embodiment, the process 120 is executed by the server system 32 (FIG. 2), and the set of cryptographic parameters having the specified characteristics is requested by one of the remote clients 34 which is running a parameter cryptographic application requiring cryptographic parameters having the specified characteristics.

The process 120 begins with a step 122 in which the system pre-computes a plurality of different types of sets of cryptographic parameters, each type being adapted for use by an associated type of cryptographic application.

The types of sets of cryptographic parameters pre-computed in step 122 preferably include sets of parameters that are most commonly being used in cryptographic applications. As one example, a common type of MultiPrime cryptographic communications system operates using: a modulus n having a length L of 1024 bits, wherein the modulus n has k=3 prime factors ($p_1$ having a length of 341 bits, $p_2$ having a length of 341 bits, and $p_3$ having a length of 342 bits); a public exponent value e=3; and a Gauss form of Chinese Remainder Algorithm. Note that there is a slight asymmetry to this system because the length of $p_3$ is slightly different from the lengths of $p_1$ and $p_2$.

In accordance with the present invention, various types of sets of cryptographic parameters may include a modulus n having any number $k \geq 1$ prime factors. Other commonly specified lengths for a modulus n include 512 bits, 1024 bits, 768 bits, and 2048 bits. However, these lengths may increase and the present invention provides for accommodating such specifications. Also, the present invention may accommodate various types of Cryptographic systems that use various other different forms of Chinese Remainder Algorithms.

Cryptographic communications systems may use a public exponent value e having any odd number value between 1 and L−1. Public exponent values of e=3 and e=65,537 are very common because these particular values facilitate fast encryption as is well understood in the art.

From step 122, the process 120 proceeds to step 124 in which the cryptographic parameter pre-computing system securely stores the different types of sets of cryptographic parameters in the key memory storage unit. In one embodiment, the key memory storage unit is implemented by the non-volatile memory unit 18 of the system 10 (FIG. 1). In another embodiment, the key memory storage unit is implemented by the server non-volatile memory unit 66 of the server system 60 (FIG. 3), the local secure memory unit 90 (FIG. 4), and the encrypted database 54 (FIG. 2) in accordance with the methods described above for securely storing sets of cryptographic parameters.

In step 126, the process 120 receives a request for a set of cryptographic parameters having the specified characteristics for use in a particular cryptographic application. The specified characteristics include: a specified length L of a requested modulus N that is to be a composite number generated from the product of an associated specified number of prime factors; a specified public exponent value e; and a specified type of Chinese Remainder Algorithm being used by the particular cryptographic application. It will be understood that the request need not include a specified public key exponent value e, and a specified type of Chinese Remainder Algorithm. These parameters are pre-computed, but are only optionally provided. If no public key exponent value e is specified, then a common public key exponent value e may be chosen by the system. It will be understood that the request may simply specify a number of prime number values having associate specified lengths.

From step 126, the process 120 proceeds to step 128 in which the system determines which one of the pre-computed sets of cryptographic parameters stored in the key memory storage unit has the specified characteristics. From step 128, the process proceeds to 130 at which it is determined whether one of the pre-computed sets of cryptographic parameters stored in the key memory storage unit has the specified characteristics, and if so, the process proceeds to step 132 in which the system accesses the determined set of cryptographic parameters having the specified characteristics from the key memory storage unit. In step 134, the system provides the determined set of cryptographic parameters with minimal latency.

If it is determined at 130 that none of the pre-computed sets of cryptographic parameters stored in the key memory storage unit has the specified characteristics, the process proceeds to "A" (to FIG. 7) to execute further steps of the process 120 including steps for generating a customized set of pre-computed cryptographic parameters in response to the request, and steps for implementing an adaptive learning sub-process of the present invention wherein the system tracks requests for sets of cryptographic parameters having specified characteristics that are not currently being pre-computed and stored by the system.

FIG. 7 shows a flow diagram illustrating further steps of the process 120 (FIG. 6) in accordance with the present invention. The process proceeds from "A" (from FIG. 6) to step 142 in which the system generates a customized set of cryptographic parameters having the specified characteristics in accordance with an appropriate one of the methods described above. In step 144, the system provides the customized set of cryptographic parameters to the requester with minimal latency. It is noted that there would be considerable latency in responding to requests for a customized set of cryptographic parameters that are not pre-computed. In an alternative embodiment of the present invention, the system may simply respond with an error message to a request for parameters having characteristics that do not match any of the securely stored parameters.

From step 144, the system proceeds to execute an adaptive learning sub-process 145 which begins with a step 146 in which the system records information indicative of the request including the specified characteristics. This information may be stored in the key memory storage unit or in any other appropriate memory storage unit. In step 148, the system initializes a count value (or increases a previously established count value) indicative of the number of requests received for sets of cryptographic parameters having the specified characteristics. In step 150, the system determines whether a threshold number of previous requests have been received for sets of cryptographic parameters having the specified characteristics. It is then determined at 152 whether a threshold number of previous requests (having the specified characteristics) has been received, and if not, the process ends. Alternatively, if it is determined at 152 that the threshold number of requests has been received, the process proceeds to step 154 in which the system begins pre-computing and securely storing sets of cryptographic parameters having the specified characteristics.

FIG. 8 shows a diagram at 160 illustrating request latency at 162 of the cryptographic pre-compute and store server system 32 (FIG. 2) as a function of time in response to bursts of requests (for sets of cryptograhpic parameters) illustrated at 164 from requesters such as a locally executed cryptographic applications or one of the clients 34 (FIG. 2). Note that the decription of requests_also applies to the system 10 (FIG. 1). The server system 32 (FIG. 2) is operative to pre-compute and securely store sets of cryptographic parameters during periods of low demand so that requested sets of cryptographic parameters may be later accessed from the key memory storage unit and issued with minimal latency, even during periods of peak demand. This approach allows peak loads to be met without degradation, while the key memory storage unit is replenished and refilled during periods where generation capacity exceeds demand. Simple expansion of the capacity of the key memory storage unit is an effective method of matching peak demand with a lower average rate.

At time $t_1$, the server system 32 (FIG. 2) is initialized and begins to precompute and securely store sets of cryptographic parameters, and continues the process of precomputing and securely storing until a time $t_2$ when the key memory storage unit reaches its full memory capacity. At times $t_3$, $t_5$, and $t_7$, the server system 32 receives bursts of requests for sets of cryptographic parameters, and during each burst of requests, the number of sets of cryptographic parameters stored in the key memory storage unit decreases. However, there is no latency in issuing key parameters in response to requests as shown by the request latency curve 162 unless the number of cryptographic parameters in the key memory storage unit is exhausted to zero, or EMPTY. Each of the burst of requests in the time intervals between times $t_3$–$t_4$, $t_5$–$t_6$, and $t_7$–$t_8$ is of a magnitude and duration that is not sufficient to fully deplete the number of key parameters in the key memory storage unit to EMPTY. However, there is a burst of requests shown in the time interval between times $t_9$–$t_{10}$ that is of a magnitude and duration that is sufficient to fully deplete the number of key parameters in the key memory storage unit to EMPTY which occurs at time $t_{10}$. During this period of high demand for new sets of key parameters, the system continues to satisfy requests from the key memory storage unit whenever possible, and meanwhile continues to replenish the key memory storage unit with new sets of key parameters. However, the request latency 162 begins to increase from zero after time $t_{10}$ due to queuing and continues to increase while the high demand continues, until the burst of requests ceases completely at time $t_{11}$ causing the request latency to quickly return to the time required to access and issue a pre-computed set of key parameters.

An advantage of the above described methods and apparatus for providing cryptographic parameters with minimal latency is that it eliminates all of the computational latency in delivering a cryptographic key when requested by an application. For example, the latency seen by a requesting application could be reduced from a few seconds to just a few microseconds. The present invention provides for an application (having capacity and transaction rate limited by slow key generation performance in accordance with prior art methods) to experience an improvement by a very large factor on the order of 100× or more.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of providing cryptographic parameters for use in cryptographic applications in response to requests therefor, comprising the steps of:
   pre-computing one or more different types of sets of cryptographic parameters, each said type of set being adapted for use by an associated type of cryptographic application, and each said type of set including an associated modulus n having an associated length L, each said modulus n being a composite number generated from the product of an associated number k of randomly generated distinct prime number values $p_1$, $p_2$, ... $p_k$, wherein $k \geq 2$;
   securely storing said pre-computed sets of cryptographic parameters in a memory storage unit;
   receiving a request for a set of cryptographic parameters having specified characteristics for use in a particular cryptographic application, said characteristics including a specified length of a requested modulus and a specified number of prime number values constituting prime factors of said requested modulus;
   determining one of said sets of cryptographic parameters stored In said memory storage unit that has specified characteristics;
   accessing said determined set of cryptographic parameters from said memory storage unit; and
   providing said determined set of cryptographic parameters with minimal latency.

2. A method as recited in claim 1 wherein:
   said step of pre-computing further includes pre-computing one or more different types of sets of cryptographic parameters, each said set of an associated type including an associated number k of randomly generated distinct prime number values that are suitable for use in an associated type of cryptographic application, wherein $k \geq 1$; and
   said step of receiving includes receiving a request specifying characteristics further including a specified number of requested prime number values.

3. A method as recited in claim 1 wherein:
   said step of pre-computing further includes pre-computing one or more different types of sets of cryptographic parameters, each said set of an associated type including an associated number k of randomly generated distinct prime number values that are suitable for use in an associated type of cryptographic application, wherein $k \geq 1$, and wherein each of said prime number values has an associated length; and
   said step of receiving includes receiving a request specifying characteristics further including a specified number of requested prime number values and an associated specified length of each of said requested prime number values.

4. A method as recited in claim 1 wherein:
   said step of pre-computing includes pre-computing one or more different types of sets of cryptographic parameters, each said set of an associated type further including an associated public key exponent value e;
   and said step of receiving includes receiving a request specifying characteristics further including a specified public key exponent value.

5. A method as recited in claim 4 wherein said step of pre-computing includes pre-computing one or more different types of sets of cryptographic parameters, each said set of an associated type further Including an associated private exponent value d determined based on said associated prime number values $p_1, p_2, \ldots p_k$ and said associated public key exponent value e.

6. A method as recited in claim 5 wherein said step of pre-computing Includes pre-computing a plurality of different one or more types of sets of cryptographic parameters, each said set of an associated type further including a set of sub-task private exponents $d_1, d_2, \ldots d_k$ pre-computed based on the associated prime number values $p_1, p_2, \ldots p_k$ and also based on the associated private exponent value d.

7. A method as recited in claim 1 wherein said step of pre-computing includes pre-computing one or more different types of sets of cryptographic parameters, each said set of an associated type further including at least one set of Chinese Remainder Algorithm coefficients pre-computed based on said k associated prime number values prime number values $p_1, p_2, \ldots p_k$; and
   said step of receiving includes receiving a request specifying characteristics further including a specified type of Chinese Remainder Algorithm.

8. A method as recited in claim 7 wherein said at least one set of set of Chinese Remainder Algorithm coefficients includes a first set of coefficients that may be used in a summation type of Chinese Remainder Algorithm, and a second set of coefficients that may be used in an iterative type of Chinese Remainder Algorithm.

9. A method as recited in claim 1 wherein each said set of parameters includes an associated number k of randomly generated prime numbers, wherein $k \geq 1$, and wherein said step of pre-computing is performed by a processing unit and a plurality of exponentiation units communicatively coupled with the processing unit, said step of pre-computing including:

randomly generating a plurality of k random odd numbers each being a prime number candidate; and performing at least one probabilistic primality test on each of said candidates, each of said primality tests including an associated exponentiation operation executed by an associated one of the exponentiation units, said exponentiation operations being performed by said associated exponentiation units in parallel.

10. A method as recited in claim 1 wherein each said set of parameters includes an associated number k of randomly generated prime numbers, wherein $k \geq 1$, and wherein said step of pre-computing is performed by a processing unit and a plurality of exponentiation units communicatively coupled with the processing unit, said step of pre-computing including:

randomly generating at least one random odd number providing a prime number candidate;

determining a plurality of y additional odd numbers based on said at least one randomly generated odd number to provide y additional prime number candidates, thereby providing a total number of y+1 candidates; and performing at least one probabilistic primality test on each of said y+1 candidates, each of the y+1 primality tests including an associated exponentiation operation executed by an associated one of y+1 of the exponentiation units, said y+1 exponentiation operations being performed by said associated y+1 exponentiation units in parallel.

11. A method as recited in claim 10 wherein each said randomly generated odd number provides a random seed, and wherein said step of pre-computing further includes the step of determining only one prime number value based on each said random seed so that successive prime numbers are not determined by multiple performances of said step of pre-computing.

12. A method as recited in claim 1 wherein said step of securely storing said pre-computed cryptographic parameters in a memory storage unit further includes storing at least a portion of said cryptographic parameters in a first memory unit that is protected within a logical and physical security boundary.

13. A method as recited in claim 12 wherein said step of securely storing said cryptographic parameters in a memory storage unit further includes:

encrypting at least one of said cryptographic parameters using a cryptographic key;

storing said cryptographic key in said first memory unit located within said security boundary; and storing said encrypted cryptographic parameters in a second memory unit located outside of said security boundary.

14. A method as recited in claim 13 wherein said step of accessing includes:

accessing said encrypted cryptographic parameters from said second memory unit;

accessing said cryptographic key from said first memory unit; and decrypting said accessed cryptographic parameters using said accessed cryptographic key.

15. A method of providing cryptographic parameters for use in cryptographic applications in response to requests therefor, comprising the steps of:

pre-computing one or more different types of sets of cryptographic parameters, each said type of set being adapted for use by an associated type of cryptographic application using an associated public key exponent value e, each said set of an associated type including, an associated modulus n having an associated length L and being a composite number generated from the product of an associated number k of randomly generated distinct and suitable prime number values $p_1, p_2, \ldots p_k$, wherein $k \geq 1$, an associated public key exponent value e, an associated private key exponent value d determined based on the associated prime number values $p_1, p_2, \ldots p_k$ and the associated public key exponent value e, a set of sub-task private exponents $d_1, d_2, \ldots d_k$ that are pre-computed based on the associated prime number values $p_1, p_2, \ldots p_k$ and the associated private key exponent value d, and at least one set of Chinese Remainder Algorithm coefficients pre-computed based on said associated prime number values $p_1, p_2, \ldots p_k$;

securely storing said different types of sets of cryptographic parameters in a memory storage unit;

receiving a request for a specified type of set of cryptographic parameters having specified characteristics for use in a particular cryptographic application, said specified characteristics including, a specified length L of a requested modulus N that is to be a composite number generated as a product of an associated specified number of prime number values, a specified public key exponent value e, and a specified type of Chinese Remainder Algorithm being used by the particular cryptographic application;

determining one of said sets of cryptographic parameters stored in said memory storage unit that has said specified characteristics;

accessing said determined set of cryptographic parameters from said memory storage unit; and providing said determined set of cryptographic parameters with minimal latency.

16. A method for providing prime number values with minimal latency in response to requests therefor, comprising the steps of:

pre-computing a plurality of random distinct prime number values that are suitable for use in a cryptographic security application;

securely storing said pre-computed prime number values in a memory storage unit;

receiving a request for at least one prime number value to be used in a particular cryptographic application, said request including information indicating a specified number of requested prime number values;

accessing at least one of said securely stored prime number values from said memory storage unit; and providing said at least one accessed prime number value with minimal latency in response to said request.

17. A method as recited in claim 16 wherein:

said step of pre-computing includes pre-computing a plurality of random distinct prime number values having different associated lengths;

said step of receiving a request further includes receiving information indicating an associated specified length for at least one of said prime number values; and said step of accessing includes, determining at least one of said securely stored prime number values that has said associated specified length, and accessing said at least one determined prime number value from said memory storage unit.

18. A system for providing cryptographic parameters for use in cryptographic applications in response to requests therefor, comprising:

- means for pre-computing one or more different types of sets of cryptographic parameters, each said type of set being adapted for use by an associated type of cryptographic application, and each said type of set including an associated number k of randomly generated distinct prime number values that are suitable for use in an associated type of cryptographic application, wherein $k \geq 1$;
- memory storage means for securely storing said pre-computed sets of cryptographic parameters;
- means for receiving a request for a set of cryptographic parameters having specified characteristics for use in a particular cryptographic application, said characteristics including a specified number of requested prime number values;
- means for determining one of said sets of cryptographic parameters stored in said memory storage unit that has specified characteristics;
- means for accessing said determined set of cryptographic parameters from said memory storage unit; and
- means for providing said determined set of cryptographic parameters with minimal latency.

19. A system as recited in claim 18 wherein:

said means for pre-computing is operative to pre-computing one or more different types of sets of cryptographic parameters, each said set of an associated type including an associated number k of randomly generated distinct prime number values that are suitable for use in an associated type of cryptographic application, wherein $k \geq 1$ and wherein each of said prime number value has an associated length; and said means for receiving is responsive to a request specifying characteristics including a specified number of requested prime number values and an associated specified length of each of said requested prime number values.

20. A system as recited in claim 18 wherein:

said means for pre-computing is operative to pre-computing one or more different types of sets of cryptographic parameters, each said set of an associated type including an associated modulus n having an associated length L, each said modulus n being a composite number generated from the product of an associated number k of randomly generated distinct prime number values $p_1, p_2, \ldots p_k$, wherein $k \geq 2$; and said means for receiving is responsive to a request specifying characteristics including a specified length of a requested modulus and a specified number of prime number values constituting prime factors of said requested modulus.

21. A system as recited in claim 20 wherein said means for pre-computing is operative to pre-computing one or more different types of sets of cryptographic parameters, each said set of an associated type further including an associated public key exponent value e; and said means for receiving is responsive to a request specifying characteristics further including a specified public key exponent value.

22. A system as recited in claim 21 wherein said means for pre-computing is operative to pre-computing one or more different types of sets of cryptographic parameters, each said set of an associated type further including an associated private exponent value d determined based on said associated prime number values $p_1, p_2, \ldots p_k$ and said associated public key exponent value e.

23. A system as recited in claim 22 wherein said means for pre-computing is operative to pre-computing one or more different types of sets of cryptographic parameters, each said set of an associated type further including a set of sub-task private exponents $d_1, d_2, \ldots d_k$ pre-computed based on the associated prime number values $p_1, p_2, \ldots p_k$ and also based on said associated private exponent value d.

24. A system as recited in claim 20 wherein:

said means for pre-computing is operative to pre-computing one or more different types of sets of cryptographic parameters, each said set of an associated type further including at least one set of Chinese Remainder Algorithm coefficients pre-computed based on said associated prime number values $p_1, p_2, \ldots p_k$; and said means for receiving is responsive to a request specifying characteristics further including a specified type of Chinese Remainder Algorithm.

25. A system as recited in claim 24 wherein said at least one set of set of Chinese Remainder Algorithm coefficients includes a first set of coefficients that may be used in a summation type of Chinese Remainder Algorithm, and a second set of coefficients that may be used In an iterative type of Chinese Remainder Algorithm.

26. A system as recited in claim 19 wherein said means for pre-computing includes a prime number generation unit for randomly generating said prime numbers.

27. A system as recited in claim 26 wherein said prime number generation unit provides for searching in parallel for a plurality of prime number values simultaneously, said prime number generation unit including:

- processing means operative to randomly generate a random odd number providing a prime number candidate, and to provide a set of test parameters associated with a probabilistic primality test to be performed on each said randomly generated number, each said set of said test parameters including said associated randomly generated number; and
- at least one exponentiation unit being communicatively coupled with said processing means, and being responsive to said set of test parameters, and operative to perform an exponentiation operation based on said set of test parameters and an associated base value, and also operative to generate a primality test result signal declaring said prime number candidate to be either composite or prime with reference to said associated base value;
- said processing means being responsive to said primality test result signal, and operative to process said test result signal for the purpose of eliminating randomly generated numbers declared to be composite in accordance with a search for prime number values.

28. A system as recited in claim 26 wherein said prime number generation unit provides for searching in parallel for a plurality of prime number values simultaneously, said prime number generation unit including:

- processing means operative to randomly generate a plurality of k random odd numbers each providing a prime number candidate, and to provide at least one set of test parameters associated with a probabilistic primality test to be performed on each one of said plurality of k randomly generated numbers, each said set of said test parameters including said associated randomly generated number and an associated base value; and a plurality of exponentiation units each being communicatively coupled with said processing means, and being responsive to an associated one of said sets of test parameters, and operative to perform an exponentiation operation based on said associated set of test parameters, and also operative to generate a primality test result signal declaring said associated prime number candidate to be either composite or prime with reference to said associated base value, said exponentiation units being operative to perform said exponentiation operations in parallel;

said processing means being responsive to said primality test result signals, and operative to process said test result signals for the purpose of eliminating randomly generated numbers declared to be composite In accordance with a search for prime number values.

29. A system as recited in claim 26 wherein said prime number generation unit provides for searching in parallel for a plurality of prime number values simultaneously, said prime number generation unit including;

processing means operative to randomly generate at least one random odd number providing a prime number candidate, and to determine a plurality of y additional odd numbers based on each of said at least one randomly generated odd number to provide y additional prime number candidates, thereby providing a total number of y+1 candidates, said processing means also being operative to provide at least one set of test parameters associated with a probabilistic primality test to be performed on each one of said prime number candidates, each said set of test parameters including said associated prime number candidate and an associated base value; and a plurality of exponentiation units each being communicatively coupled with said processing means, and being responsive to an associated one of said sets of test parameters, and operative to perform an exponentiation operation based on said associated set of test parameters, and also operative to generate a primality test result signal declaring said associated prime number candidate to be either composite or prime with reference to said associated base value, said exponentiation units being operative to perform said exponentiation operations in parallel;

said processing means being responsive to said primality test result signals, and operative to process said test result signals for the purpose of eliminating randomly generated numbers declared to be composite in accordance with a search for prime number values.

30. A system as recited in claim 29 wherein each said randomly generated odd number provides a random seed, and wherein said processing means is further operative to determine only one prime number value for each said random seed so that said prime number generation unit does not generate successive primes.

31. A system as recited in claim 26 wherein said prime number generation unit is configured to be protected within a logical and physical security boundary.

32. A system as recited in claim 31 wherein said storage means includes a first memory unit located within said security boundary of said prime number generation unit.

33. A system as recited in claim 32 wherein:

said storage means further includes a second memory unit located outside of said security boundary; and said prime number generation unit includes means for encrypting a pre-computed prime number using a cryptographic key, storing said cryptographic key in said first memory unit located within said security boundary, and storing the encrypted prime number in said second memory unit located outside of said security boundary.

34. A system as recited in claim 33 wherein said second memory unit is a database.

35. A server system operative to pre-compute prime numbers and securely store the pre-computed prime numbers for later use, comprising:

a server computing system communicatively coupled with a plurality of remote clients via a network, and being responsive to requests for randomly generated prime numbers each being associated with ones of said remote clients, each of said requests including a specified number of prime number values and a specified length of each of said prime number values;

a prime number generation unit communicatively coupled with said server computing system and providing for pre-computing a plurality of randomly generated prime numbers, said prime number generation unit being configured to be protected within a logical and physical security boundary; and a secure memory unit protected within said security boundary and being communicatively coupled with said server computing system and said prime number generation unit, said secure memory unit providing for storage of said pre-computed prime numbers;

said server computing system being operative to access said prime numbers stored in said secure memory unit, and to provide said prime numbers with minimal latency in response to said requests for randomly generated prime numbers.

36. A server system as recited in claims 35 further comprising:

an unsecure memory unit located outside of said security boundary and being communicatively coupled with said server computing system and said prime number generation unit, said unsecure memory unit also providing for storage of pre-computed prime numbers; and means for encrypting a pre-computed prime number using a cryptographic key, for storing said cryptographic key in said secure memory unit protected within said security boundary, and for storing the encrypted prime number in said unsecure memory unit located outside of said security boundary;

said server computing system being further operative to access said encrypted prime number stored in said unsecure memory unit, to access said cryptographic key from said secure memory unit, to decrypt said accessed prime number using said cryptographic key, and to provide said decrypted prime number with minimal latency in response to one of said requests for a randomly generated prime number.

37. A server system for processing cryptographic transactions and for providing prime number values in response to user requests therefor, comprising:

a server computing system operative communicatively coupled with a plurality of remote clients via a network, and including a queuing means for storing a plurality of queued job requests including cryptographic transaction job requests, and prime number requests having associated length parameters specifying a length for a randomly generated prime number, said server computing system being operative to determine a number of prime number requests and a number of transaction job requests currently stored in said queuing means;

a cryptographic processing unit communicatively coupled with said server computing system, and being operative to search for randomly generated prime numbers and to process cryptographic transactions in response to requests therefor;

at least one exponentiation unit communicatively coupled with said cryptographic processing unit and providing exponentiation resources for use in searching for randomly generated prime numbers and In processing cryptographic transactions; and a storage means communicatively coupled with said cryptographic unit for storing said randomly generated prime numbers;

said cryptographic unit also being operative to perform the steps of, determining a number of pre-computed prime numbers currently stored in the local secure memory unit;

based on the number of prime number requests and cryptographic transaction job requests currently stored in the queuing unit, and the number of cryptographic key values currently stored in the storage unit, dynamically allocating a first portion of said exponentiation resources for prime number searching, and a second portion of the total exponentiation resources for processing cryptographic transactions, performing prime number searching functions in response to said prime number requests and associated length parameters, said number searching functions including randomly generating at least one random odd number having the specified length, and performing at least one probabilistic primality test on said random number, each of said primality tests including an associated exponentiation operation executed using said first dynamically allocated portion of the said exponentiation resources, and performing cryptographic transaction processing functions in response to said cryptographic transaction job requests using said second dynamically allocated portion of said exponentiation resources.

38. A server system as recited in claim 37 wherein said cryptographic unit is operative to perform said step of determining said first and second dynamically allocated portions of said exponentiation resources by performing the further steps of:

determining whether said number of stored prime number values is less than a predetermined number; and if the number of stored prime numbers is less than a predetermined number, dynamically increasing said first portion of said exponentiation resources allocated for prime number generating.

39. In a server system for processing cryptographic transactions and for providing randomly generated prime numbers in response to requests therefor, the server system including a computing system operative to communicate with a plurality of remote clients via a network, a memory storage unit for storing said randomly generated prime numbers, a queuing unit for storing a plurality of queued job requests including cryptographic transaction job requests, and prime number requests having associated length parameters specifying a length for a randomly generated prime number to be provided, and at least one exponentiation unit communicatively coupled with said cryptographic unit and providing exponentiation resources for use in searching for randomly generated prime numbers and in processing cryptographic transactions, a process of dynamically allocating portions of said exponentiation resources for processing cryptographic transactions and for searching for randomly generated prime numbers, comprising the steps of:

determining a number of prime number requests and a number of cryptographic transaction job requests currently stored in the queuing unit;

determining a number of pre-computed prime numbers currently stored in the memory unit; and based on said number of prime number requests and said number of cryptographic transaction job requests currently stored in the queuing unit, and said number of prime numbers currently stored in the memory unit, determining portions of said exponentiation resources to be dynamically allocated for prime number searching, and for processing cryptographic transactions.

40. In a server system for processing cryptographic transactions and for providing randomly generated prime numbers in response to requests therefor, the server system including a computing system operative to communicate with a plurality of remote clients via a network, a memory storage unit for storing said randomly generated prime numbers, a queuing unit for storing a plurality of queued job requests including cryptographic transaction job requests, and prime number requests having associated length parameters specifying a length for a randomly generated prime number to be provided, and at least one exponentiation unit communicatively coupled with said cryptographic unit and providing exponentiation resources for use in searching for randomly generated prime numbers and in processing cryptographic transactions, a software system for dynamically allocating portions of said exponentiation resources for processing cryptographic transactions and for searching for randomly generated prime numbers, comprising:

a first module for determining a number of prime number requests and a number of cryptographic transaction job requests currently stored in the queuing unit;

a second module operative to determine a number of pre-computed prime numbers currently stored In the memory unit;

a third module operative to determine a portion of said exponentiation resources to be dynamically allocated for prime number searching, and a portion of said exponentiation resources to be dynamically allocated for processing cryptographic transactions based on said number of prime number requests and said number of cryptographic transaction job requests currently stored in the queuing unit, and based on said number of prime numbers currently stored in the memory unit;

a fourth module operative to perform prime number searching functions in response to said prime number requests and associated length parameters, said number searching functions including randomly generating at least one random odd number having the specified length, and performing at least one probabilistic primality test on said random number, each of said primality tests including an associated exponentiation operation executed using said first dynamically allocated portion of the said exponentiation resources; and a fifth module operative to perform cryptographic transaction processing functions in response to said cryptographic transaction job requests using said second dynamically allocated portion of said exponentiation resources.

41. A method, comprising:

storing on a server a set of cryptographic parameters suitable for generating a cryptographic key;

receiving a request from a client for a cryptographic parameter, the request comprising a specified cryptographic parameter characteristic;

comparing the specified characteristic to a stored cryptographic parameter characteristic within the stored set of cryptographic parameters;

providing the requested cryptographic parameter to the client If the specified characteristic matches the stored characteristic; and generating at the client the cryptographic key using the provided cryptographic parameter.

42. The method of claim 41, wherein receiving the request from the client for the cryptographic parameter further comprises receiving the request wherein the requested cryptographic parameter comprises one or more distinct randomly generated prime numbers.

43. The method of claim 42, wherein receiving a request from the client for the cryptographic parameter further comprises receiving the request wherein the specified cryptographic parameter characteristic comprises a number indicative of how many of the of the one or more distinct randomly generated prime numbers are being requested.

44. The method of claim 41, wherein receiving the request from the client for the cryptographic parameter further comprises receiving the request wherein the requested cryptographic parameter comprises a modulus generated from a plurality of distinct randomly generated prime numbers.

45. The method of claim 44, wherein receiving a request from the client for the cryptographic parameter further comprises receiving the request wherein the specified cryptographic parameter characteristic comprises a length of the modulus requested.

46. A computer, comprising:

a processor; and a memory coupled to the processor, the memory used to store a set of cryptographic parameters usable to generate a cryptographic key;

wherein the processor receives a request from a second computer for a plurality of cryptographic parameters, said request includes a specified cryptographic parameter characteristic;

wherein the processor provides the requested plurality of cryptographic parameters in response to the request; and wherein at least one of the plurality of requested cryptographic parameters comprises a modulus generated from a plurality of distinct randomly generated prime numbers.

47. The computer of claim 46, wherein at least one of the plurality of requested cryptographic parameters comprises one or more distinct randomly generated prime numbers.

48. The computer of claim 47, wherein the specified cryptographic parameter characteristic comprises a number indicative of how many of the one or more distinct randomly generated prime numbers are requested.

49. The computer of claim 46, wherein the specified cryptographic parameter characteristic comprises a length of the modulus requested.

* * * * *

UNITED STATES PATENT AND TRADEMARK OFFICE
CERTIFICATE OF CORRECTION

PATENT NO. : 7,016,494 B2
APPLICATION NO. : 09/818074
DATED : March 21, 2006
INVENTOR(S) : W. Dale Hopkins et al.

It is certified that error appears in the above-identified patent and that said Letters Patent is hereby corrected as shown below:

In column 10, line 3, delete "$P(p_l=p_B|p_i=p_A)=P(p_i=p_B)$" and insert -- $P(p_j = p_B | p_i = p_A) = P(p_j = p_B)$ --, therefor.

In column 10, line 44, delete "$d = e^{-1} \mod((p_1-1)(p_{2-1}) \ldots (p_k-1))$" and insert -- $d \equiv e^{-1} \mod ((p_1-1)(p_2-1) \ldots (p_k-1))$ --, therefor.

In column 11, line 44, delete "$\cdot w_i \mod n$," and insert -- $\cdot w_1 \mod n$, --, therefor.

In column 12, line 57, delete "$P_1$" and insert -- $p_1$ --, therefor.

In column 23, line 58, in Claim 1, delete "In" and insert -- in --, therefor.

In column 24, line 34, in Claim 5, delete "Including" and insert -- including --, therefor.

In column 24, line 39, in Claim 6, delete "Includes" and insert -- includes --, therefor.

In column 24, line 50-51, in Claim 7, delete "prime number values" before "$p_1, p_2, \ldots p_k$".

In column 24, line 56, in Claim 8, delete "set of" before "Chinese".

In column 28, line 25, in Claim 25, delete "In" and insert -- in --, therefor.

In column 29, line 15, in Claim 28, delete "In" and insert -- in --, therefor.

In column 29, line 20, in Claim 29, delete "including;" and insert -- including: --, therefor.

In column 31, line 9, in Claim 37, delete "In" and insert -- in --, therefor.

In column 32, line 38, in Claim 40, delete "In" and insert -- in --, therefor.

UNITED STATES PATENT AND TRADEMARK OFFICE
CERTIFICATE OF CORRECTION

PATENT NO. : 7,016,494 B2  
APPLICATION NO. : 09/818074  
DATED : March 21, 2006  
INVENTOR(S) : W. Dale Hopkins et al.

It is certified that error appears in the above-identified patent and that said Letters Patent is hereby corrected as shown below:

In column 33, line 8, in Claim 41, delete "If" and insert -- if --, therefor.

In column 33, line 21, in Claim 43, delete "of the" before "one".

Signed and Sealed this

Twenty-eighth Day of July, 2009

JOHN DOLL  
*Acting Director of the United States Patent and Trademark Office*